(12) United States Patent
Gould et al.

(10) Patent No.: US 8,095,610 B2
(45) Date of Patent: Jan. 10, 2012

(54) METHODS AND APPARATUS FOR CENTRALIZED AND DECENTRALIZED EMERGENCY ALERT MESSAGING

(75) Inventors: Kenneth Gould, Oakton, VA (US); George Sarosi, Charlotte, NC (US)

(73) Assignee: Time Warner Cable Inc., New York, NY (US)

( * ) Notice: Subject to any disclaimer, the term of this patent is extended or adjusted under 35 U.S.C. 154(b) by 397 days.

(21) Appl. No.: 12/079,781

(22) Filed: Mar. 28, 2008

(65) Prior Publication Data

US 2009/0248828 A1 Oct. 1, 2009

(51) Int. Cl.
*G06F 15/16* (2006.01)
*G06F 15/177* (2006.01)

(52) U.S. Cl. .................. 709/207; 709/217; 709/220

(58) Field of Classification Search .................. None
See application file for complete search history.

(56) References Cited

U.S. PATENT DOCUMENTS

| | | | |
|---|---|---|---|
| 3,993,955 A | 11/1976 | Belcher et al. | |
| 6,240,555 B1 | 5/2001 | Shoff et al. | |
| 6,452,492 B1 | 9/2002 | Drury | |
| 6,615,175 B1 | 9/2003 | Gazdzinski | |
| 6,714,534 B1 | 3/2004 | Gerzberg et al. | |
| 6,766,163 B1 | 7/2004 | Sharma | |
| 6,771,302 B1 | 8/2004 | Nimri et al. | |
| 6,792,616 B1 | 9/2004 | Jerding | |
| 6,903,779 B2 | 6/2005 | Dyer | |
| 7,114,169 B1 | 9/2006 | Kahn | |
| 7,119,675 B2 | 10/2006 | Khandelwal | |
| 7,126,454 B2 | 10/2006 | Bulmer | |
| 7,142,892 B2 | 11/2006 | Dennis et al. | |
| 7,159,230 B2 | 1/2007 | Manson et al. | |
| 7,296,074 B2 | 11/2007 | Jagels | |
| 7,324,003 B2 | 1/2008 | Yun | |
| 7,336,942 B2 | 2/2008 | Wang | |
| 7,592,912 B2 | 9/2009 | Hasek | |
| 2002/0080038 A1 | 6/2002 | Smith | |
| 2002/0107032 A1* | 8/2002 | Agness et al. | 455/456 |
| 2003/0121036 A1 | 6/2003 | Lock et al. | |
| 2003/0169182 A1 | 9/2003 | Wilhelm et al. | |
| 2003/0217365 A1 | 11/2003 | Caputo | |
| 2004/0181811 A1 | 9/2004 | Rakib | |
| 2004/0257440 A1* | 12/2004 | Kondo et al. | 348/94 |
| 2005/0015799 A1 | 1/2005 | Park | |
| 2005/0151639 A1 | 7/2005 | Bulmer | |
| 2005/0162267 A1 | 7/2005 | Khandelwal et al. | |
| 2005/0198684 A1 | 9/2005 | Stone et al. | |
| 2006/0040639 A1 | 2/2006 | Karl | |
| 2006/0161946 A1 | 7/2006 | Shin | |
| 2007/0004377 A1 | 1/2007 | Medford et al. | |
| 2007/0033531 A1 | 2/2007 | Marsh | |
| 2007/0136777 A1 | 6/2007 | Hasek | |
| 2007/0207771 A1 | 9/2007 | Bowser et al. | |

* cited by examiner

*Primary Examiner* — John B. Walsh
(74) *Attorney, Agent, or Firm* — Gazdzinski & Associates, PC

(57) ABSTRACT

Apparatus and methods for providing emergency alert system (EAS) data to subscribers of a content-based network for multiple locations including via mobile devices. In one embodiment, the apparatus comprises a server performing real-time receipt and encapsulation of the EAS data, transport of the EAS data to client devices over an IP or other packet-switched network, and use of applications running on the client devices to decode and display the EAS data. In one variant, a centralized EAS (CEAS) entity is used to aggregate and distribute EAS messages to video registration servers (VRS), which use stored client device data and user preferences to map delivery of relevant EAMs over the IP network. In another variant, instant messaging (IM) infrastructure is used to deliver and display at least portion of the EAS data via a separate transport process.

34 Claims, 13 Drawing Sheets

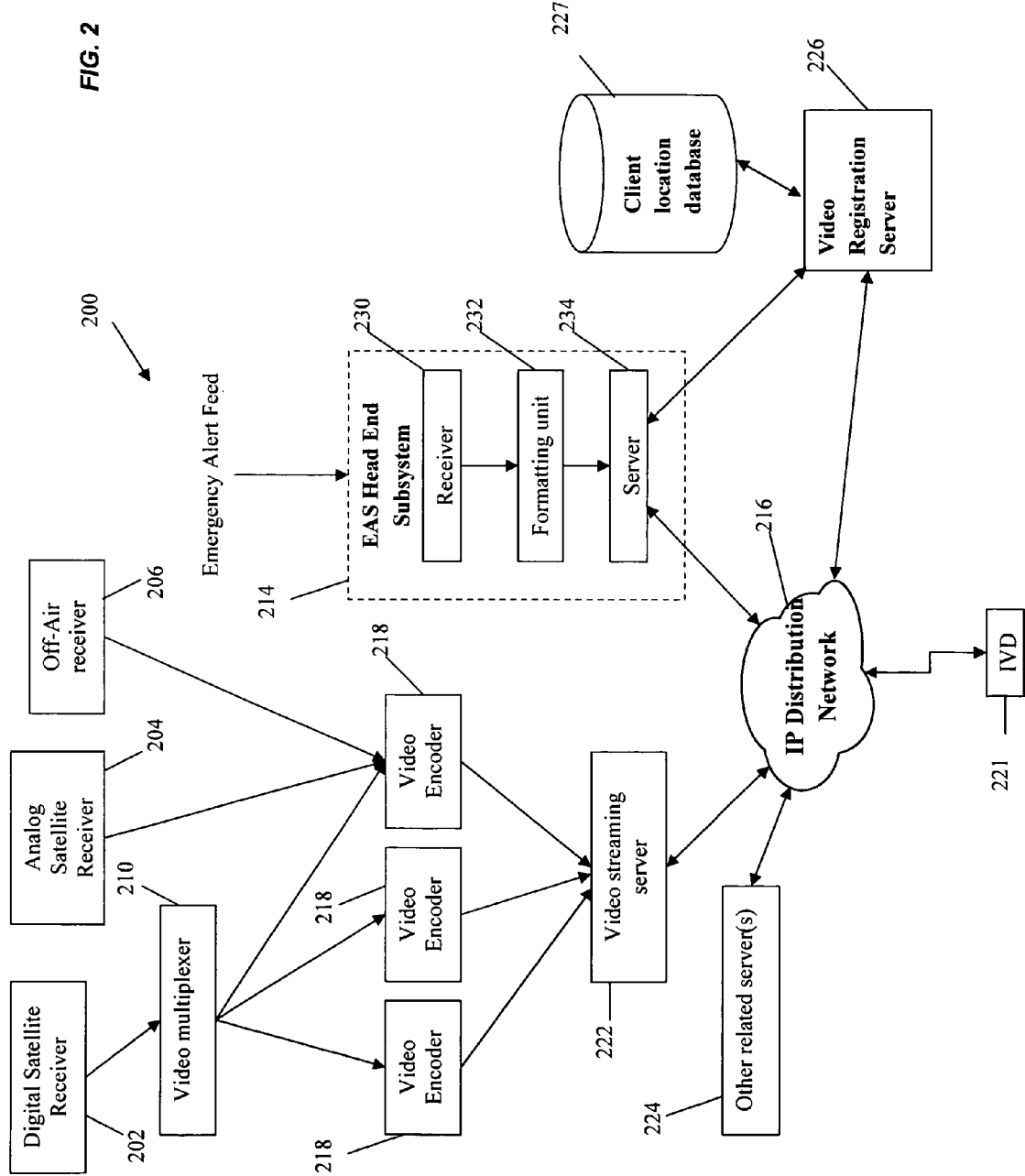

METHODS AND APPARATUS FOR CENTRALIZED AND DECENTRALIZED EMERGENCY ALERT MESSAGING

RELATED APPLICATIONS

This application is related to co-owned and co-pending U.S. patent application Ser. No. 11/298,247 filed Dec. 9, 2005 and entitled "CAPTION DATA DELIVERY APPARATUS AND METHODS", and Ser. No. 11/299,169 filed Dec. 9, 2005 entitled "EMERGENCY ALERT DATA DELIVERY APPARATUS AND METHODS", both incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of delivery of digital data (e.g., text, video, and/or audio) over networks such as the Internet, and specifically in one aspect to delivering emergency alert system (EAS) data or message within an Internet Protocol (IP) or similar network environment.

2. Description of Related Technology

Emergency Alert System (EAS)—

As is well known, the Emergency Alert System (EAS) is designed to allow for the rapid and widespread dissemination of information relating to a national or local emergency to the general public. EAS messages are transmitted for either national, state or local emergencies or other events. Examples of these emergencies or events include: severe weather watch/storm warning, flash floods, earthquakes/tsunami, and war or other "man made" emergencies.

The EAS was designed in part by the Federal Communications Commission (FCC) in cooperation with the National Weather Service (NWS) and the Federal Emergency Management Agency (FEMA), in order to support the roles of each organization. The FCC provides information to broadcasters, cable system operators, and other participants in the EAS regarding the technical and operational requirements of the EAS. Additionally, the FCC ensures that state and local EAS plans conform to FCC rules and regulations. The NWS provides emergency weather information to alert the public about dangerous or potentially conditions weather conditions or other natural events. FEMA provides direction for state and local emergency planning officials to plan and implement their roles in the EAS.

Since Dec. 31, 1998, cable systems that have 10,000 or more subscribers are part of the EAS. These cable systems have the capability to transmit emergency messages on all of their video channels.

Alerts sent via the EAS may arrive in the form of text, audio and/or video content. Depending on the message type, the subscriber's television or set-top box (STB) will display the message in the appropriate format and according to the prescribed method. State and Local area emergency messages may be transmitted by using EAS Header and End of Message Codes. In television environments, the FCC recommends that the codes be preceded by an announcement that informs listeners that an EAS transmission will occur.

In current digital and analog television systems, the EAS transmissions are received from an over-the-air broadcast. The transmission is then used in two different ways.

First, for analog broadcasts, all of the analog channels are either force-tuned to a broadcast of the EAS transmission or create the appropriate overlay of text and audio. Nothing is required at the subscriber (e.g., set-top box) side since all switching and display functionality is performed in the network headend.

Second, for digital broadcasts, the digital headend application server receives the transmission and creates the proper audio, video and/or text message for the digital set-top box (DSTB) or other consumer premises equipment. The DSTB is then responsible for displaying the message to the user as prescribed by the government mandate. If the EAS transmission is video, then the DSTB will "forcibly" tune its tuner to the appropriate analog RF channel to receive, decode and display the video.

Testing of the EAS system generally comprises a weekly test consisting of an eight-second digital data signal. There is also a monthly test that utilizes a test script (e.g., "This is a test of the Emergency Alert System—this is only a test . . . "). The monthly test script may be developed locally and may contain information that is relevant to the local area into which it is being delivered.

Other features of the digital EAS systems include:

(i) Automatic Operation—The EAS digital system architecture allows broadcast stations, cable systems, participating satellite companies, and other services to send and receive emergency information quickly and automatically even if those facilities are unattended;

(ii) Redundancy—The EAS requires monitoring of at least two independent sources for emergency information. This insures that emergency information is received and delivered to viewers and listeners; and (iii) Multi-language—EAS digital messages can be automatically converted into any language used by the broadcast station or cable system.

"IP" and Other Network Paradigms—

Internet protocol (IP) networks are now ubiquitous throughout the world. Such networks allow users access to inter alia the Internet and a plethora of different web sites, services, and capabilities, including streaming or download delivery of media. More recently, network operators have begun using networks such as IP networks to distribute broadcast television programming to subscribers. This is to be contrasted with more traditional radio frequency (over-the-air) broadcasts, or in-band delivery via packetized MPEG-2 program streams. Such IP delivery of broadcast television programming also requires a method for the delivery of EAS data to subscriber units such as personal computers (PC), as well as a method to display such information on the display monitor (and audio system) of these units. One exemplary approach to providing such services is described in co-owned and co-pending U.S. patent application Ser. No. 11/299,169 filed Dec. 9, 2005 entitled "EMERGENCY ALERT DATA DELIVERY APPARATUS AND METHODS" previously incorporated herein.

Further, the delivery of broadcast television and other data using an IP network allows subscribers to view television from IP video devices (IVD). IVD are traditionally more mobile than legacy video devices (i.e., traditional STBs). Further, because a traditional RF connection is not established, there currently exists no way for the network to "know" where a subscriber is using an IVD as well as no way to securely and reliably transmit EAS data to an IVD. The increasing trend toward using IVD while away from one's "home" highlights this highly problematic void in EAS coverage.

In emerging Internet protocol television (IPTV) and similar distribution networks, a wider choice of audio/video codecs is being considered. For example, MPEG-2, MPEG-4/H.264 (advanced video codec or "AVC"), Windows Media Codec by Microsoft, and RealVideo by Real Networks are a few of the possible audio/video compression formats that have been deployed. While these new formats and their associated compression technology are useful in providing streaming audio/video programs to end users, these formats do not typically support any type of EAS data delivery. While some video codecs have the ability to embed caption or similar information within the video stream (MPEG-2/MPEG-4, etc.), many video codecs do not (e.g., RealVideo). Accordingly, the ability to transport at least some of the EAS information to the displaying client outside of the content (e.g., video) packet streams would be of particular utility.

Other Emergency Alert Approaches—

A variety of other approaches to emergency alert transmission over a network (and display be user devices) are evidenced in the prior art. For example, U.S. Pat. No. 3,993,955 to Belcher, et al. issued Nov. 23, 1976 entitled "Method and apparatus for establishing emergency communications in a two-way cable television system", incorporated herein by reference in its entirety, discloses a two-way cable television communications system wherein a central or master station is coupled to a plurality of remote stations through a coaxial cable network, each remote unit is provided with means for decoding an emergency alert transmission signal from the master station to generate an internal signal to sound an annunciator, alerting a subscriber or viewer at the remote station that an emergency communication is forthcoming, switching on a television receiver at the remote station, if the television receiver is not on, and tuning the television receiver through a converter to a predetermined television channel to condition the television receiver to receive emergency communications from the master station.

U.S. Pat. No. 6,240,555 issued May 29, 2001 to Shoff, et al entitled "Interactive entertainment system for presenting supplemental interactive content together with continuous video programs", incorporated herein by reference in its entirety, discloses an interactive entertainment system that enables presentation of supplemental interactive content along side traditional broadcast video programs. The programs are broadcast in a conventional manner. The supplemental content is supplied as part of the same program signal over the broadcast network, or separately over another distribution network. A viewer computing unit is located at the viewer's home to present the program and supplemental content to a viewer. When the viewer tunes to a particular channel, the viewer computing unit consults an electronic programming guide (EPG) to determine if the present program carried on the channel is interactive. If it is, the viewer computing unit launches a browser. The browser uses a target specification stored in the EPG to activate a target resource containing the supplemental content for enhancing the broadcast program. The target resource contains display layout instructions prescribing how the supplemental content and the video content program are to appear in relation to one another when displayed. When the data from the target resource is downloaded, the viewer computing unit is responsive to the layout instructions obtained from the target resource to display the supplemental content concurrently with the video content program. Embedding the layout instructions in the supplemental content places control of the presentation to the content developers.

U.S. Pat. No. 6,452,492 to Drury issued on Sep. 17, 2002 entitled "Emergency alert system", incorporated herein by reference in its entirety, discloses an alert system for providing an alert of an actual or impending emergency to homes, businesses and the like. The alert system is used in cable system network over which communication signals are transmitted to a receiver remote from the transmitter. Such communication signals have associated therewith at least one distinguishable modulation frequency. The alert system includes a mechanism for receiving an alert request and a transmitter for transmitting an alert signal in response to the alert request. The transmitter is coupled with the cable system and generates an alert signal which is modulated at a frequency distinguishable from the frequencies of the communication signals. The transmitter includes a sideband filter to reduce the subharmonics generated around the alert signal frequency. The receiver includes a mechanism for detecting a valid alert signal from the alert signal received and for generating an alarm signal therefrom. The alert system also comprises an alarm indicator connected to the receiver providing an alarm upon receipt of an alarm signal.

U.S. Pat. No. 6,714,534 to Gerszberg, et al. issued Mar. 30, 2004 entitled "Lifeline service for HFCLA network using wireless ISD", incorporated herein by reference in its entirety, discloses a system architecture for bypassing a local exchange carrier comprises an intelligent terminal, a residential gateway coupled to the terminal, a cable facility management platform terminating a twisted pair or coaxial cable facility and a network service platform. The twisted pair and/or coaxial cable fed, integrated residence gateway controlled intelligent terminal or set-top device provides a plurality of enhanced services. One necessary service is lifeline service that may be provided over the coaxial cable via a cable modem of the integrated residence gateway, over the twisted pair facility or via wireless means. The integrated residence gateway is coupled to either or both of the coaxial cable or twisted pair and distributes the bandwidth facilities available over either service vehicle to customer devices including the set top box. Wireless lifeline or emergency services may be offered through transceivers placed at the integrated residence gateways and/or at taps feeding the integrated residence gateways.

U.S. Pat. No. 6,766,163 issued Jul. 20, 2004 to Sharma entitled "Method and system of displaying teletext information on mobile devices", incorporated herein by reference in its entirety, discloses a communication system and method for communicating teletext information to mobile stations. A wireless access protocol (WAP) server is coupled to a television station and receives a signal which includes teletext information from the station. The WAP server includes a teletext decoder which decodes the teletext information in the transmitted signal. The decoded information is stored in memory using a server controller. The controller receives information requests from a network interface coupled to the mobile stations. The controller accesses the teletext information stored in memory and transmits the information to the mobile station through the network interface.

U.S. Pat. No. 6,771,302 issued Aug. 3, 2004 to Nimri, et al entitled "Videoconference closed caption system and method", incorporated herein by reference in its entirety, discloses a system and method for closed caption in a videoconference environment. In a method according to one embodiment of the invention, a connection is established with a videoconference device. Subsequently, a closed caption page associated with the videoconference device is selected. Text is then entered on the closed caption page. The text is displayed to at least one device associated with a videoconference in which the videoconference device is participating.

U.S. Pat. No. 6,792,616 issued Sep. 14, 2004 entitled "System and method for providing a plurality of programming services in a television system", incorporated herein by reference in its entirety, discloses a system and method of providing for displaying a full service cable television system. The cable television system is adapted to provide a plurality of different user services. Accordingly, the system and method are designed to allow a user to access services in an efficient memory conserving fashion. Using a plurality of data tables, a cable television system is able to access a plurality of different services including cable channels, interactive program guides, pay per view activation, video on demand and interactive online services such as World Wide Web browsing and E-mail via their home television set. A mechanism is provided whereby applications on a home device (HCT) can be activated from the server via a signaling message received from the HCT, to provide the user with services such as Emergency Alert Messages, email, and other messaging.

U.S. Pat. No. 6,903,779 issued Jun. 7, 2005 to Dyer entitled "Method and system for displaying related components of a media stream that has been transmitted over a computer network", incorporated herein by reference in its entirety, discloses a system and method for displaying related components of a media stream that has been transmitted over a computer network that includes at least one storage device that communicates with a television decoder and with the video display. Information from one or more components of the media stream is extracted from the media stream and delivered to one or more storage devices. This stored component is subsequently transmitted to the video display in response to an information release signal that is embedded in the information. The invention can be used to display closed caption and other information with associated audio and video signals using an audio-visual media player.

United States Patent Application No. 20030121036 to Lock, et al. published on Jun. 26, 2003 entitled "CATV messaging alert system", incorporated herein by reference in its entirety, discloses an invention that relates generally to use of standard video scan lines of commercial television programming in a cable television system for transmitting alerting and other messaging information, to an alert receiver unit at an end user's address. The alert receiver unit operates completely independently of any television set at the end user's address, other than to send the CATV signal from the alert receiver unit to the television set. The subscriber or other user can send certain pre-selected signals to the operator of the cable TV system, to another subscriber/user, or to another recipient designated by the operator of the cable TV system. The invention relates to emergency notification systems and to systems for communicating emergency messages to subscribers to cable television distribution networks, as well as to non-subscribers.

United States Patent Publication No. 20040181811 to Rakib published on Sep. 16, 2004 entitled "Thin DOCSIS in-band management for interactive HFC service delivery", incorporated herein by reference in its entirety, discloses circuitry and process for transmitting video-on-demand and interactive service data and other service data on an MPEG multiplex and sending management and control data including conditional access The management and control data can include requested application software for download to the STBs, requested program guide data, conditional access key data such as EMM messages, event provisioning data, emergency alert service data, and messages to manage and control the interactive and VOD services, and targeted advertising, etc.

United States Patent Publication No. 20050015799 to Park published Jan. 20, 2005 entitled "Apparatus and method for displaying out-of-band (OOB) channel information in open cable system", incorporated herein by reference in its entirety, discloses an apparatus and a method for displaying out-of-band information without turning on a TV or set-top box in an open cable system. A receiving unit receives an out-of-band signal transmitted from a headend and parses the signal. A storage unit stores the parsed data and a user's display setting. A processing unit loads the user's display setting from the storage unit and processes the data according to the user's display setting. A control unit further processes the processed data and causes the further processed data to be displayed on an auxiliary display or main display, wherein the auxiliary display displays the further processed data in a stand-by mode state. The OOB signal may contain an electronic program guide (EPG), impulse-pay-per-view (IPPV), Data, an emergency alert system (EAS), video on demand (VOD), web, e-mail information and the like.

United States Patent Publication No. 20050151639 to Bulmer published Jul. 14, 2005 entitled "Alert System", incorporated herein by reference in its entirety, discloses a system for alerting the public regarding a criminal act; a plurality of law enforcements modes which generate alerts related to a criminal or emergency issue and transmit the same to a central server; a central server system including an administration workstation and database for receiving the alerts and creating broadcast messages; and a broadcast system associated with the central server for broadcasting an alert via a televised broadcast, internet transmission or satellite transmission.

United States Patent Publication No. 20050162267 to Khandelwal, et al. published on Jul. 28, 2005 and entitled "Emergency alert service", incorporated herein by reference in its entirety, discloses an emergency alert service that responds to receipt of emergency alert messages by filtering, formatting and routing emergency alert information to a variety of different networked appliances (and also to remote devices). In this way, a consistent warning message is disseminated simultaneously over many different warning systems, thus increasing warning effectiveness while simplifying the warning task. The system thus provides a common alerting protocol that is capable of exchanging all-hazard emergency alerts and public warnings over different kinds of networks.

United States Patent Publication No. 20050198684 to Stone, et al. published Sep. 8, 2005 entitled "Method and apparatus for providing a DSG to an OOB transcoder", incorporated herein by reference in its entirety, discloses a method and apparatus for providing a DOCSIS Set-top Gateway (DSG) to OOB transcoder in a cable television system comprising a legacy set-top device. In the first embodiment, a one-way DSG to OOB transcoder acts as a proxy device for OOB messages to the DSG tunnel. These OOB messages may include messages containing system information, emergency alert information, and conditional access information. These set-top devices equipped with one or more DOCSIS tuners are referred to as "DSG compatible" set-top devices. Once an OOB message is generated, the OOB message is transmitted to the DSG tunnel. The DSG to OOB transcoder of the present invention then captures the OOB message, and communicates the OOB message to the legacy set-top device. In a second embodiment of the invention, the legacy set-top device may communicate, return communications to the DSG to OOB transcoder by generating a QPSK message. The QPSK message is then translated to an OOB message comprising DOCSIS content.

"Digicable" is another prior art system supplied by General Instrument (Motorola) for end-to-end satellite and cable system distribution networks. It uses an out-of-band data channel to deliver common system information associated with all in-band channels. Out-of-band traffic in these systems included: Entitlement Management Messages (EMM) addressed to individual STBs and carrying conditional access secure authorization instructions for requested services; Service Information that supports the STB navigation application with information about the requested service; program guide information to display what is on the various channels at various times; an Emergency Alert System messages to cause the STB to display a text message, play an audio message or force tuning to an alert channel.

So-called "reverse 911" or voice broadcasting is another prior art system employed to distribute emergency alert messages to a large group of people. Voice broadcasting broadcasts telephone messages to call recipients within a specific geographical area. Voice broadcasting systems employ a database of phone lists as well as digitally recorded phone messages. Using telephony components, these computers can substantially simultaneously broadcast a message. Interactive voice broadcasting systems have also been employed, wherein the call recipient to listen to the recorded message and interact with the system by pressing keys on the phone keypad. The system can detect which key is pressed and be programmed to interact and play various messages accordingly. Although the reverse 911 system is able to mass deliver phone messages, it is not able to ensure that the person phoned will be contacted; nor is it able to send messages to a person's mobile devices. Thus if a person is not home to receive the reverse 911 call, there is a significant risk that the person will not receive important information.

Based on the foregoing, it is clear that while the prior art has generally recognized the need to receive and provide EAS data to client devices over analog networks, and to enable EAS decode and display capability compatible with an audio/video decoder on a client device, it fails to address several issues pertaining to: (i) the now-pervasive use of IP-based deployments; (ii) the mobility of modem subscribers and diversity of mobile network paradigms; (iii) the diversity of different mobile devices and media formats/codecs in use on such mobile devices; and (iv) the desire of many users to have EAS information relating to locations which are not solely limited to their premises or their current location.

Generally speaking, existing Emergency Alert Messages (EAMs) are tied to the physical geographic area in which a receiving device (e.g., settop box in a cable network) is located and registered. There are currently no systems to allow such mobile devices to receive EAMs when roaming out of their base geographic area. Legacy settop boxes receive EAS messages from their network controllers (e.g., DNCS/DAC), or from the EAS servers. While the geographic locations of cellular phones (e.g., IP-enabled "smartphones") can be determined by cellular tower identification and/or triangulation, and IP-geolocation services exist today to determine where an IP device is located based upon its network address or associated base station (e.g., WiFi hotspot), these techniques have not been to date leveraged to both locate and service network subscribers regardless of their location, and with respect to multiple locations of interest.

For example, a legacy MPEG-2 settop box associated with a cable television or satellite network located in San Diego will get fire warnings related to San Diego. An IP-enabled settop box or laptop that is entitled to view video (and is associated with a subscriber in San Diego) can also obtain EAMs related to San Diego. When that device is transported to New York by the San Diego subscriber, however, such prior art approaches do not "follow" the subscriber and provide EAMs to the subscriber for both New York and San Diego, both of which are likely to be of interest to the subscriber.

Moreover, such prior art approaches do not allow for "look-ahead" mapping of EAMs; e.g., whether a travel route to be taken by the subscriber has any pending or incipient EAMs associated with it which may be used to assist the subscriber in planning their journey or at least anticipate significant delays or obstacles.

It may also be of great interest to a subscriber to be able to specify certain other locales of interest, such as where their friends, family or relatives may be exposed to emergency conditions and not have access to an EAM system (e.g., they are camping in the mountains and unaware of an incipient blizzard in their area).

Further, the prior art systems operate by sending one message which is not able to be augmented so as to have applicability to a wider spectrum of viewers. For example, there currently exists no mechanism for augmenting or appending the message on a local level to add details or useful ancillary information which may not be apparent to the message's ultimate distributor.

Accordingly, apparatus and methods are needed that provide the capability to receive and deliver emergency alert data in multiple forms (i.e., audio, video, and text data) to the subscriber's IP-based device for display and presentation in a geographically relevant and timely manner. A mechanism for appending emergency alert message data to add e.g., regional or other contextually useful details is also needed. Such apparatus and methods should be deployable over a packet-switched network (such as an IP network), such that subscribers can use the service by using commonly available personal media device (PMD), personal computer (PC), or similar software applications, and would also enable a user to select other geographical areas in which they are interested in receiving emergency alert data other than the geographical area in which the subscriber is physically present (or with which their subscription is associated).

They should also be able to localize or regionalize the delivery of the EAS data (e.g., by zip code or some other geographic metric), and substantially pre-empt at least portions of ongoing programming so that the emergency alert data is clearly and unequivocally communicated to the targeted subscriber base. The exemplary system would also advantageously include a mechanism for the delivery of different levels or priorities of emergency alert messages depending on prevailing conditions relating to the subscriber or others; e.g., when the subscriber is not physically in the geographical area directly affected.

Lastly, these methods and apparatus would require only minimal changes to existing systems, thereby leveraging the installed infrastructure to the maximum degree practicable.

SUMMARY OF THE INVENTION

The present invention addresses the foregoing needs by providing, in various embodiments, methods and apparatus for providing EAS data over networks such as packet-switched (e.g., IP) networks.

In a first aspect of the invention, a client device adapted for use within a network is disclosed. In one embodiment, the network comprises an IP network, and the device comprises: a receiver, said receiver adapted to receive content from said network; a decoder, said decoder adapted to decode said content; a content rendering apparatus, said rendering apparatus adapted to render said content; and a processor, said processor adapted to run at least one computer program. The at least one program is configured to: register with a network entity; receive and decode emergency alert data based at least in part on said registration; substantially preempt at least an audio portion of said content being decoded and rendered on said client device; and render said decoded emergency alert data.

In one variant, the at least one program is further adapted to return said client device to said content after completion of said emergency alert data.

In another variant, the emergency alert data comprises textual data, and said at least one program configured to receive emergency alert data comprises an instant messaging program.

In yet another variant, said receiver comprises an RF interface adapted to associate with a wireless gateway or access point. The RF interface is compliant for example with an IEEE Std. 802.11 WiFi Standard.

In a further variant, said device further comprises a cellular wireless interface.

In still another variant, said registration with said network entity comprises registration with a network entity within a cable television or satellite content delivery network, said network entity having access to a subscriber database of said cable or satellite network.

In another variant, the at least one computer program comprises a client portion of a client-server architecture, and said registration by said at least one program comprises association of said client device with at least one subscriber account for said cable or satellite network.

In yet another variant, the device further comprises apparatus adapted to provide information as to the current physical or geographic location of said client device to said network entity over said IP network. Another entity comprises e.g., a registration entity within a cable television or satellite network, and said alert data comprises data relevant to said physical or geographic location.

In a further variant, the at least one computer program further comprises a user interface, said user interface adapted to receive information from a user of said client device regarding one or more locations of interest to said user and for which said user wishes to receive emergency alert data.

In another variant, said content being rendered comprises audio-only content, and said emergency alert data comprises audio-only data.

In a second aspect of the invention, emergency data registration apparatus is disclosed. In one embodiment, the apparatus is for use in a content-based network, and is capable of determining the location of a plurality of client devices and storing information relating thereto, and comprises: a storage device, said storage device adapted to store said plurality of data relating to said individual ones of said plurality of client devices; and a processor in data communication with said storage device and adapted to run at least one computer program thereon. The at least one computer program is adapted to: compile a plurality of data relating to the location of individual ones of said plurality of client devices; correlate one or more of said individual ones of said client devices to a single user account; and designate said one or more correlated client devices for delivery of emergency alert data.

In one variant, at least one of said plurality of client devices comprises consumer premises equipment in signal communication with a radio frequency interface at a premises indicated within said single user account; and at least one of said plurality of client devices comprise a substantially portable IP-enabled device not disposed at said premises.

In another variant, said compiling occurs upon receipt of requests for access to said network by respective individual ones of said plurality of client devices.

In yet another variant, said data relating to the location of individual ones of said devices comprises at least one of: (i) IP addresses of respective ones of said plurality of client devices; and (ii) association with a particular gateway or access point having a known or determinable location.

In a further variant, said act of compiling comprises utilizing data from a subscriber database to determine the location of at least one of said client devices.

In still another variant, the apparatus further comprises apparatus configured to receive information from at least one user of said network indicating one or more geographic areas of interest.

In yet a further variant, the apparatus further comprises apparatus adapted to transmit said emergency alert data based at least in part on said designation. Said apparatus adapted to transmit said emergency alert data is further adapted to: discover one or more audio or video processing capabilities of said one or more correlated client devices; and process said emergency alert data in at least one aspect so as to be compatible with said discovered one or more capabilities. The discovery comprises e.g., accessing a database of information maintained by an operator of said content based network relating to at least said one or more correlated client devices, and said processing comprises at least one of trascoding or transrating said emergency alert data.

In another variant, said at least one computer program is further adapted to assign at least one of a plurality of quality of service (QoS) levels to said delivery of said emergency alert data. The assignment of at least one of a plurality of quality of service (QoS) levels to said delivery of said emergency alert data is based for example at least in part on a correlation between actual locations of said one or more correlated devices and one or more locations associated with said emergency alert data.

In a third aspect of the invention, client location apparatus capable of processing data associated with a plurality of substantially portable client devices is disclosed. In one embodiment, said apparatus comprises: a processor; a storage device in data communication with said processor; and a computer program stored at least partly on said storage device and operative to run on said processor. The computer program is adapted to: obtain first data relating to the current locations of said individual ones of said plurality of client devices; and correlate said first data with location data associated with an emergency alert with said first data to identify at least one of said client devices prospectively affected by said emergency alert.

In one variant, the apparatus further comprises apparatus adapted to cause transmission of said emergency alert to said at least one prospectively affected client devices via at least an Internet Protocol (IP) network.

In another variant, the apparatus further comprises a mass storage device in data communication with said processor, said storage device adapted to store said first data and second data, said second data allowing for the association of said individual ones of said client devices with respective subscriber accounts of said content-based network. At least one of said first and second data comprises e.g., a network address, and said location data of said emergency alert comprises FIPS data.

In another variant, said computer program is further adapted to receive third data relating to one or more locations of interest to respective owners of said individual ones of said plurality of client devices, and said computer program is further configured to correlate second emergency alert data relating to said one or more locations of interest with at least one of said at least one prospectively affected client devices.

In yet another variant, the apparatus further comprises: a first apparatus adapted to receive said emergency alert from one or more sources; and a second apparatus adapted to distribute at least a portion of said emergency alert to a plurality of network entities. For example, said network entities each comprise a video registration server adapted to register said client devices within said network.

The apparatus may also further comprise a third apparatus adapted to modify said emergency alert or append data thereto. The modification or appendage comprises for example reformatting said alert for distribution over an Internet protocol (IP) network; at least one of altering the bitrate or encoding of said emergency alert so as to be compatible with the video or audio playing capabilities of said correlated ones of said client devices; or adding to or subtracting substantive content from said emergency alert based at least in part on said location data associated with said emergency alert.

In a further variant, said correlation further comprises correlating second data uniquely associated with one or more substantially portable client devices and indicating the one or more geographic locations of interest specified by a user of said one or more client devices, with said first data. The one or more geographic locations of interest do not e.g., comprise the current location of said one or more client devices.

In another variant, said second data uniquely associated with one or more substantially portable client devices comprises data indicating the location of a subscriber's primary residence or premises.

In a fourth aspect of the invention, a method for distributing emergency alert data to a user of a content-based network is disclosed. In one embodiment, the method comprises: receiving emergency alert data relating to at least a first location of interest to said user; distributing said emergency alert data to a first client device associated with said user over said content-based network; and distributing said emergency alert data to a second client device associated with said user over a network other than said content-based network.

In one variant, said content based network comprises a cable television or satellite network, and said other network comprises a packet-switched Internet Protocol (IP) network.

In another variant, said first location of interest comprises the same location as at least one of said first or second client devices.

In a further variant, said first location of interest comprises a location previously specified by said user as a location of interest, yet which is not the location of either said first or second client devices.

In yet another variant, said first location of interest comprises either: (i) the same location as at least one of said first or second client devices; or (ii) a location previously specified by said user as a location of interest, yet which is not the location of either said first or second client devices; and wherein said method further comprises applying different quality-of-service (QoS) policies to said acts of distributing, respectively.

Alternatively, said first location of interest comprises either: (i) the same location as at least one of said first or second client devices; or (ii) a location previously specified by said user as a location of interest, yet which is not the location of either said first or second client devices; and said method further comprises applying different client device video or audio play policies to said acts of distributing, respectively.

In still another variant, said distributing said emergency alert data to a first client device associated with said user over said content-based network comprises distributing said emergency alert data to a first client device having a substantially fixed location and associated with said user; and said distributing said emergency alert data to a second client device associated with said user over a network other than said content-based network comprises distributing said emergency alert data to a portable or mobile client device at a second location. Distribution to said first client device comprises e.g., distributing over a cable television or satellite network, and distributing to said second client device comprises distributing over a packet-switched Internet Protocol (IP) network. Alternatively, the distribution comprises distributing over a cable television or satellite network, and distributing to said mobile or portable client device comprises distributing over a cellular data or telephony network, said mobile or portable device comprising a device having a radio frequency interface adapted to communicate with said cellular network.

As yet another alternative, distributing to said mobile or portable client device comprises distributing over a packet-switched Internet Protocol (IP) network, said distributing comprising sending said alert data to said client device using an IP address previously registered by said user. Or, distributing to said mobile or portable client device comprises distributing over a packet-switched Internet Protocol (IP) network, said distributing comprising sending said alert data to said mobile or portable client device using a network address dynamically assigned thereto, said network address correlated to said mobile or portable device using at least a unique device identification (ID).

In another embodiment, the method comprises: receiving emergency alert data relating to at least a first location of interest to the user; distributing the emergency alert data to a first client device having a substantially fixed location and associated with the user; and distributing the emergency alert data to a second portable or mobile client device at a second location, the second client device being also associated with the user.

In a fifth aspect of the invention, a storage apparatus is disclosed. In one embodiment, the apparatus comprises a computer-readable medium, said medium being adapted to store at least one computer program, said at least one program comprising a plurality of instructions which, when executed by a computer: receive data relating to mobile client devices associated with users of a content-based network; obtain an alert; and evaluate said alert and said received data to determine which of said mobile client devices should receive said alert.

In one variant, said data relating to said mobile client device comprises data selected from the group consisting of: (i) the current location of said mobile device; (ii) the location of a premises of a user of said mobile device; and (iii) a location of interest to said user which is not their premises or current location. The mobile device comprises for example an IP-enabled mobile device, and said evaluation comprises comparison of location data associated with at least one of said alerts to said data relating to said mobile client device.

In another embodiment, the program comprises a plurality of instructions which when executed by a computer: receive data relating to one or more alerts; obtain data relating to a mobile client device; and evaluate the alert to determine if the mobile client device should play the one or more alerts.

In one variant, the data relating to the mobile client device comprises data selected from the group consisting of: (i) the current location of the mobile device; (ii) the location of a premises of a user of the mobile device; and (iii) a location of interest to the user which is not their premises or current location.

In another variant, the mobile device comprises an IP-enabled mobile device, and the evaluation comprises comparison of location data associated with at least one of the alerts to the data relating to the mobile client device.

In a sixth aspect of the invention, a method of doing business is disclosed. In one embodiment, the method comprises: providing mandated emergency alert services to a subscriber of a content-based network at a first location; and selectively providing emergency alert services to one or more mobile client devices of the subscriber for monetary compensation.

In one variant, the mandated alert services are provided to the subscriber free of charge as part of a subscription plan.

In a seventh aspect of the invention, emergency alert data distribution apparatus is disclosed. In one embodiment, the apparatus comprises: a first apparatus adapted to receive an emergency alert from one or more sources; a second apparatus adapted to distribute at least a portion of the emergency alert to a plurality of network entities, the network entities each adapted to: correlate first data contained within the emergency alert to second data uniquely associated with one or more substantially portable client devices; and based at least in part on the correlation, distribute the at least portion of the emergency alert to correlated ones of the one or more substantially portable devices.

In one variant, the network entities each comprise a video registration server adapted to register the client devices within the network.

In another variant, the apparatus further comprises a third apparatus adapted to modify the emergency alert or append data thereto. The modification or appendage comprises e.g., reformatting the alert for distribution over an Internet protocol (IP) network, or at least one of altering the bitrate or encoding of the emergency alert so as to be compatible with the video or audio playing capabilities of the correlated ones of the client devices, or adding to or subtracting substantive content from the emergency alert based at least in part on a geographic location or region associated with the emergency alert.

In yet another variant, the first data contained within the emergency alert comprises data relating to one or more geographic locations or regions, and the second data uniquely associated with one or more substantially portable client devices comprises data indicating the current or recent location of the one or more client devices.

In a further variant, the first data contained within the emergency alert comprises data relating to one or more geographic locations or regions, and the second data uniquely associated with one or more substantially portable client devices comprises data indicating the one or more geographic locations of interest specified by a user of the one or more client devices. For example, the one or more geographic locations of interest do not comprise the current or recent location of the one or more client devices.

In still another variant, the first data contained within the emergency alert comprises data relating to one or more geographic locations or regions, and the second data uniquely associated with one or more substantially portable client devices comprises data indicating the location of a subscriber's primary residence or premises.

In an eighth aspect of the invention, a method of distributing alert information is disclosed. In one embodiment, the method comprises: receiving an alert at a substantially centralized distribution entity; and sending the alert from the distribution entity to a plurality of registration entities, the registration entities adapted to: receive data relating to client devices associated with users of a content-based network; and evaluate the alert and the received data to determine which of the client devices should receive the alert.

In one variant, the method further comprises processing the alert at the distribution entity to amend, append data to, or subtract data from, the alert before it is sent to the registration entities.

In another variant, wherein the evaluating further comprises correlating one or more locations associated with the alert to one or more locations of the client devices.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2 is a functional block diagram illustrating an exemplary packet-switched distribution network architecture including one embodiment of the emergency alert system (EAS) of the present invention.

DETAILED DESCRIPTION OF THE INVENTION

Figure 1:
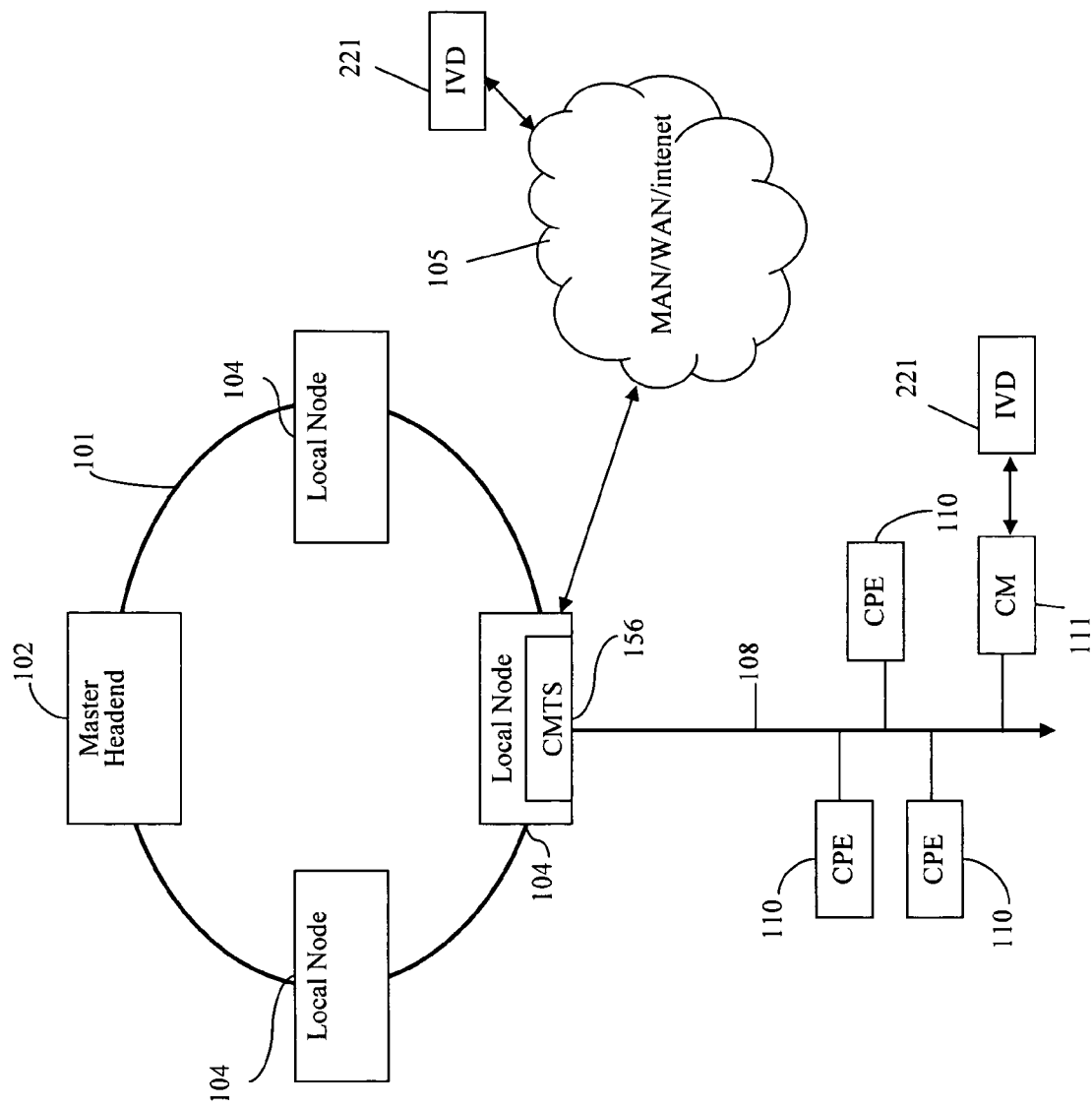
FIG. 1 is a functional block diagram illustrating an exemplary content-based (e.g., cable) network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "cellular" refers without limitation to any wireless telecommunications (and/or data) apparatus or system providing multiple user access including for example those of the 2G, 2.5G, 3G, or AMPS families. Well known cellular standards and technologies include e.g., VMTS, GSM, 3GPP/WCDMA, 3GPP2 (CDMA2000), IS-95, IS-136, IS-54, NAMPS, and PCS-1900.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "host device" refer without limitation to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "IP" and "Internet Protocol" refer without limitation to any of the Internet protocols including e.g., IPv4 (RFC-791 (1981), et seq.), and IPv6 (RFC-2460 (1998), et seq.).

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "metadata" comprises without limitation ancillary or extra data; e.g., that not typically found in typical primary content (or at least not visible to the users of the network).

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term. "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CPDP, satellite systems, millimeter wave or microwave systems, acoustic, and infrared (i.e., IrDA).

Overview

In one aspect of the invention, methods and apparatus for distributing and displaying emergency alert system (EAS) data (audio, video, and/or text/data files) in a heterogeneous network environment are disclosed. In an exemplary embodiment, the network environment includes an Internet Protocol (IP) based network, as well as a cable television or satellite network. Subscriber client devices are registered with a network video registration server (VRS). The VRS is able to collect various types of data from the client devices, the latter which may include e.g., legacy settop box devices which are connected to an RF interface, as well as from non-legacy IP-enabled video devices (IVD). At least some of the client devices may also be portable or mobile.

The EAS of the invention (including the VRS) enables distribution of emergency alert messages (EAMs) and associated data to the various different client devices via the aforementioned cable and IP networks based on, inter alia, the relevance of the EAM to a particular subscriber's locations of interest, which may include for example: (i) their home or primary premises, (ii) their current location (which may be the same or different than (i)), and/or (iii) locations of interest which are not part of (i) or (ii) above, such as the location of their second or vacation home, office, friends, family, etc. This in effect affords a subscriber seamless and pervasive EAM delivery for alerts that may affect a variety of different locations of significance to that subscriber.

In the exemplary embodiment, the present invention effectively leverages the ubiquity of IP networks and mobile IP-enabled devices to distribute EAM data to the subscriber's location, regardless where it is. This affords the traveling subscriber not only with real-time EAM coverage for their travel destination and primary premises, but also for one or more user-selected locations of interest as previously noted. This functionality is accomplished in one variant using a centralized EAS (CEAS) architecture, whereby a centralized EAM processing and distribution entity is used to distribute EAMs to a variety of VRS devices. The VRS devices perform correlation or mapping of the EAM particulars (e.g., areas of relevance, etc.) to the subscriber's IVDs and locations of interest as maintained in a database, thereby determining which IVDs should receive which EAMs. The IVDs can be accessed using the IP network, and optionally located if desired using a number of geolocation or network-based techniques.

The invention also advantageously provides for reuse of existing equipment intended for delivery of content over the packet-switched network for emergency alert functions. In this fashion, no new infrastructure or significant upgrades are required to implement the invention. For example, optional use of extant authentication, encryption, and "anti-spoofing" techniques readily available in IP networks and IP-enabled client devices may be employed, thereby further leveraging the installed infrastructure base while assuring the integrity of the EAS system and its delivered content.

In another embodiment, the EAS delivery system of the invention allows the subscriber to perform advance EAM planning for their trip, such as by specifying one or more waypoints along their route (and optionally the estimated time of arrival at each) so that they can see both currently pending EAMs for those areas before their trip, as well as be provided real-time coverage during their trip.

Methods of operating the network(s), client devices, and for doing business using the enhanced EAS data delivery capabilities referenced above, are also described.

DETAILED DESCRIPTION OF EXEMPLARY EMBODIMENTS

Exemplary embodiments of the apparatus and methods of the present invention are now described in detail. While these exemplary embodiments are described in the context of the previously mentioned hybrid fiber coax (HFC) cable architecture and associated IP networking infrastructure, the general principles and advantages of the invention may be extended to other types of networks and architectures where delivery of emergency or captioned information or data is required or desirable. Such other networks or architectures may be broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Network-Side Architecture—

Referring now to FIG. 1, an exemplary data-over-cable (DOCSIS) network 101, including broadcast IP (e.g., IPTV) service, is shown. A "master" headend 150 is connected with one or more local nodes 104 via a network 101. The network 101 could for example comprise an optical fiber network of the type known in the art using dense wave-division multiplexing (DWDM), Synchronous Optical Network (SONET) transport technology or gigabit Ethernet transport. In the downstream direction (from the headend servers or nodes to the CPE 110), this network performs the function of carrying digital and analog television signals as well as packetized data (e.g., IP) traffic. A cable modem tennination system (CMTS) 106 located at a local node 104 provides connectivity to the CPE 110 via the coaxial drop 108. A cable modem (CM) 111 is used to interface with the CMTS 106 to provide DOCSIS connectivity for any premises IP video devices (IVDs) 221, such as PCs or the like. The CMTS interfaces 106 in turn are connected directly or indirectly to the Internet or IP backbone (e.g., a MAN, WAN, or internet 105), thereby providing access for the CPE 110 to the Internet (or other internets, intranets, or networks) via the cable network infrastructure. Alternatively or in tandem, the headend 150 is connected to one or more such outside networks (not shown), thereby providing connectivity for the CPE and headend components.

Aggregation of television programs that include local and regional programming, or other types of content, occurs at the headend 150, where these programs are converted into a suitable transport format and a "channel line-up" is created for delivery to the downstream CPE 110.

Figure 1A:
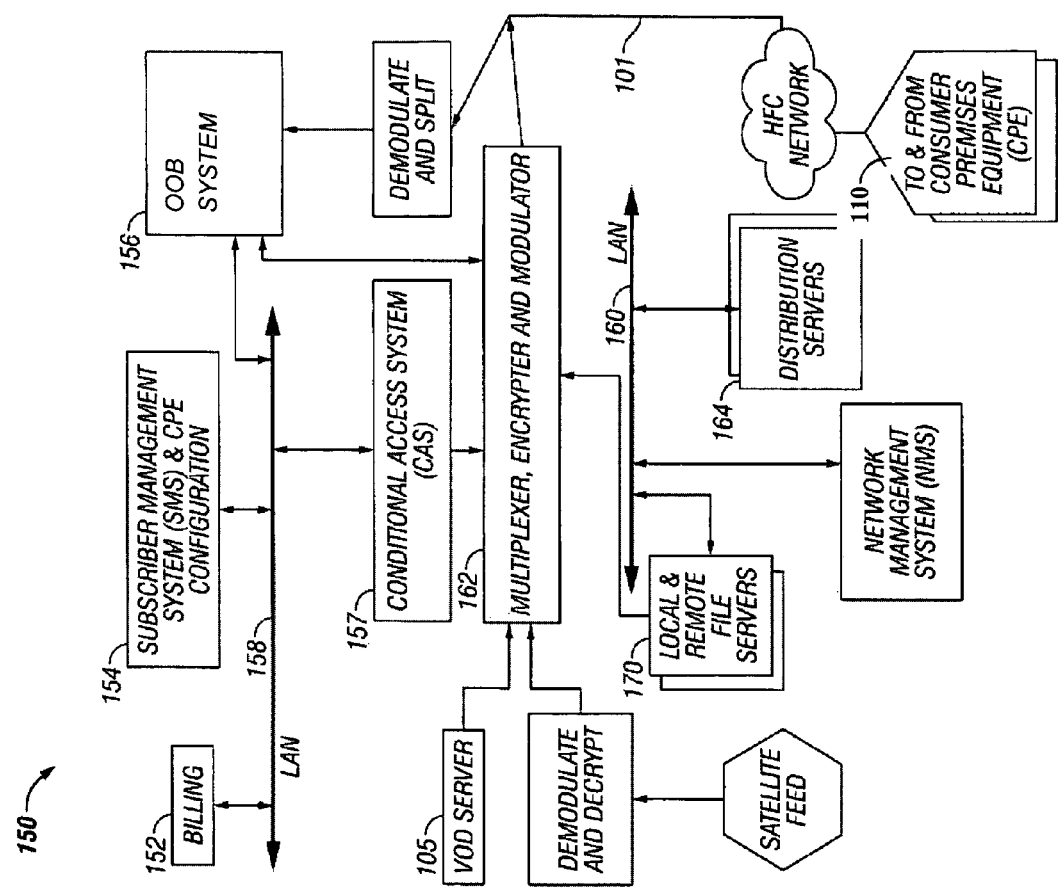
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. The headend architecture 150 may also include a cable-modem termination system (CMTS) if desired.

It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 110 ("downstream") are multiplexed together in the headend and sent to neighborhood hubs via a variety of interposed network components.

Content (e.g., audio, video, etc.) is provided in each downstream (in-band) channel associated with the relevant service group. To communicate with the headend or intermediary node (e.g., hub server), the CPE 110 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

It will be noted with respect to FIGS. 1-1a, the client premises device (CPE) 110 is intended to include without limitation both legacy devices (such as traditional settop boxes) as well as IP video devices (WE)s) 221. A legacy device in the present context is a CPE 110 which is not IP enabled, but rather receives video stream from an RF connection. An IVD 221 (described in greater detail subsequently herein) comprises a device which receives video streams via an IP-based transport (which may or may not be RF/coaxial connection; e.g., IP-over-DOCSIS, or over a CAT-5 TSP cable, wireless interface, etc.). These different types of devices may be hereinafter referred to collectively as "client devices".

Referring now to FIG. 2, an exemplary configuration of a packet-switched network (e.g., "EPTV" network) useful with the present invention is illustrated. While described in the context of an Internet Protocol (IP) network (e.g., TCP/IP packet network), it will be recognized that the principles of the invention can be extended to other transport modalities and network paradigms.

The network of FIG. 2 effectively operates logically "along side" the in-band content delivery system described with respect to FIG. 1a, and shares many common elements. It includes digital satellite receivers 202, analog satellite receivers 204 and off-air receivers 206 deployed within the cable network in order to receive content such as broadcast television programs. This content is then distributed over the cable network. With respect to the IP network, the digital satellite feed received via the receiver 202 is sent to a video multiplexer 210 that provides one or more digital programs to one or more video encoders 218 to transcode/transrate or otherwise process incoming digital video streams to a format suitable for loading onto the video streaming server (VSS) 222. It is from the VSS 222 that the content streams are delivered to client devices or CPE 110, 221.

EAS Subsystem Architecture—

An Emergency Alert Service (EAS) server subsystem 214 is shown in FIG. 2, which operates in conjunction with the in-band and IP content systems described above. This subsystem includes a receiver 230 responsible for receiving emergency alert messages from message feeds (e.g., in the form of RF communications on government designated disaster message broadcast frequencies), or by other means. The messages or data thus received are converted into a digital data format suitable for transmission over the IP network using a formatting unit 232. The formatting unit 232 may also "regionalize" or localize the data to allow for targeted or focused delivery. The data is localized in one embodiment by utilization of the FIP standard code attached to each EAM. Every EAM is associated with a geographical area by Federal Information Processing standard codes (FIPs code). The EAS subsystem 214 compares, using the video registration server (VRS) 226, the FIPs of the EAM to those associated with the client devices 110, 221. The FIPs of the client devices 110, 221 are established by registration of the devices 110, 221 with the VRS 226, or by utilization of an STB network controller (SNC) in the case of legacy devices; a detailed description of this system is provided subsequently herein. Note that in FIG. 2, actual implementations of the illustrated functions may be on separate (and even geographically disparate) platforms.

The exemplary EAS subsystem 214 also contains one or more servers 244 that operate in conjunction with other servers in the network in order to transmit emergency messages/content to the client devices 110, 221 over the interposed IP distribution network 216. As previously noted, the client devices may be heterogeneous in nature (e.g., legacy devices, IP-enabled devices, PMDs, etc.), and may be geographically co-located or disparate, which are salient advantages of the present invention. Note that the EAMs may be transmitted to legacy devices either via the EAS server 234, or via the VRS 226, depending on network configuration.

The VSS 222 and the EAS message server 234 are in turn in data communication with the EP Distribution Network 216 which, in the context of a cable network, may comprise, inter alia, the coaxial "drop" 108 of FIG. 1 between the CPE 110 (client devices 110, 221) and CMTS 110, or the MAN/WAN/internet 105, or yet other interfaces. Thus, the client devices 110, 221 may receive the video stream (e.g., IPTV broadcast) as well as EMS content where appropriate. Other architectural elements connected to the IP distribution network 216 are shown as "other related servers" 224 in FIG. 2.

Client devices 110, 221 (such as for example PCs connected to cable modems, CAT-5 drops or WiFi APs) are connected to the IP distribution network and perform the functions of, inter alia, decoding and displaying the video and/or EAS signals they are intended to receive, as described in greater detail subsequently herein.

CEAS Subsystem Architecture—

Figure 2A:
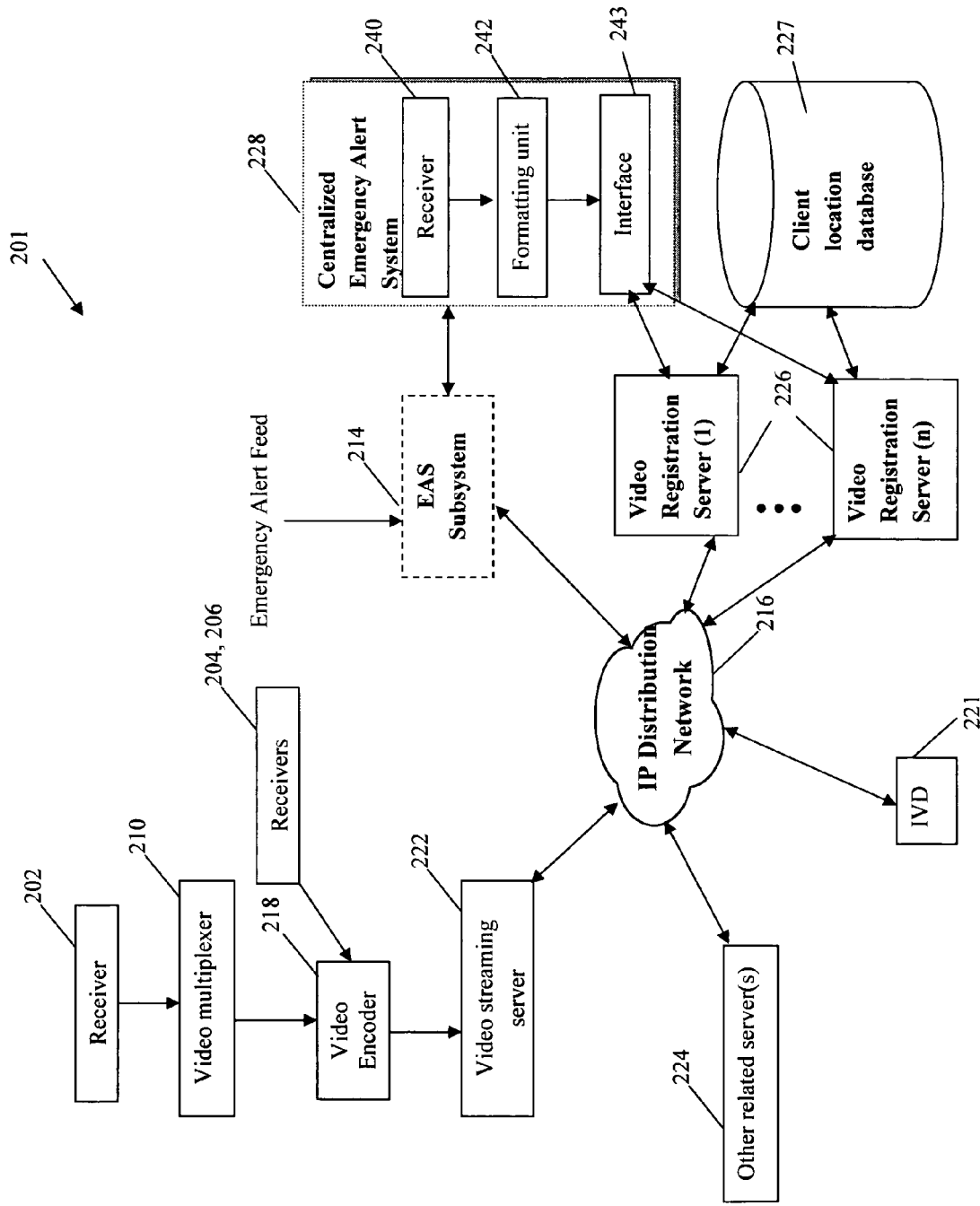
FIG. 2a is a functional block diagram illustrating an exemplary packet-switched distribution network architecture including one embodiment of the centralized EAS (CEAS) of the present invention.

Another embodiment of the present invention is illustrated in FIG. 2a. According to this embodiment, the network 201 comprises an EAS subsystem 214 which are in communication with one or more Centralized Emergency Alert Service (CEAS) subsystems 228. The CEAS subsystems 228 may be headend entities, located at hubs, or at other locations.

At a high level, the CEAS functions to, inter alia, provide centralization of EAM finctions; i.e., receive EAMs injected into the system at a local level (such as by a municipality in a given area), and pass them on to one or more VRSs 226 for transmission to the aforementioned IVDs 221 associated with the relevant FIP codes of the EAM being sent. Hence, the exemplary CEAS acts as a "distribution point" of sorts for EAMs to be delivered to IVDs 221 within the network. As discussed subsequently herein, the VRS 226 in one embodiment maps the FIP codes to an IVD identifier (which may be a network address such as e.g., an IP or MAC address). This is in contrast to certain embodiments of the EAS architecture 201 of FIG. 2, in that the latter may be configured in a substantially decentralized manner; i.e., each EAS subsystem 214 may operate largely as a stand-alone, local-level system if desired.

The CEAS may also append or amend the EAMs received from the EAS 214 or another source for local distribution (via the relevant VRS 226).

The illustrated CEAS subsystem 228 is shown to operate in conjunction with the in-band and IP content systems similar to those described above. As discussed, at headend receivers 202, 204, 206, a content stream is received, and where appropriate, multiplexed 210. The video content stream is then encoded 218 and sent to a video streaming server 222 which is in communication with an IP distribution network 216. Other headend (and non-headend) server entities 224 (discussed above) are also in communication with the IP distribution network 216.

In one scenario, the CEAS receives a locally generated and injected message, and may either (i) pass it on to the one or more VRSs 226 unamended via the interface 243, or (ii) amend the message and then pass it on, as described in greater detail below. In either situation, the CEAS 228 advantageously affords the opportunity for local-level EAM insertion and tailoring, thereby allowing for both more useful and timely EAM information. This can be particularly useful in time-sensitive applications such as tornadoes or fast-moving brush fires.

As illustrated in FIG. 2a, the exemplary configuration of the CEAS subsystem 228 includes a receiver 240 responsible for receiving emergency alert messages from the EAS subsystem 214 or the local injection point (described above). The messages are in one variant received exactly as sent; however, a formatting unit 242 present in the CEAS subsystem 228 enables the received messages to be formatted in such a way so as to allow for the insertion of additional data (an addendum or other ancillary data component) thus creating an appended message. hi other words, the formatting unit 242 permits an authorized party to insert additional pertinent EAM message data (or even additional messages that are related to the "priinary," received EAM) into a given EAM stream at the "centralized" (CEAS) level.

Alternatively, in another variant, the receiver and formatting unit may be obviated with the interface 243 alone, which serves the EAM to the requesting VRS 226, the latter which appends or modifies the original EAM for distribution based on e.g., client-specific data.

Moreover, in other variants, the EAM may be altered or processed in various ways for use in a certain context (i.e., as opposed to merely appending or inserting additional data to/into an existing EAM). For example, an EAM may be transcoded or transrated, have its for-mat changed (e.g., SD to HD or vice versa), truncated or expanded, have metadata attached or remnoved (e.g., metadata descriptive of the content of the EAM, originating source, issue time, expiry time, etc. and/or other relevant information).

The formatting unit 242 is also adapted to then re-convert the amended/processed message into a digital data format suitable for transmission over the IP network (or to the VRS 226, depending on how the network is structured). This may also include formatting the message appropriately for the target IVD) as determined by the VRS 226 or client database 227; e.g., so that the extant codec on the IVD can read and utilize the EAM when ultimately delivered.

Note that while the embodiment of FIG. 2a illustrates transmission over the IP network 216 via the VRS 226, the CEAS 228 may tie directly into the IP network, thereby obviating any transmission to the VRS 226. In such cases, the CEAS 228 requests the needed information from the relevant VRS(s) 226 and performs the mapping and EAM serving itself.

The VSS 222 (discussed above) and the CEAS subsystem 228 are in direct or indirect communication with the IP Distribution Network 216; which, in the context of a cable network, may comprise, inter alia, the coaxial "drop" 108 of FIG. 1 between the CPE 110 (client devices 110, 221) and CMTS 106, and/or other external network interfaces such as the MAN/WAN/internet 105 of FIG. 1. Thus the client devices 110, 221 will receive the video stream (e.g., RF QAM/ MPEG-2 or IPTV) as well as EMS content where appropriate. Other architectural elements which may be connected to the IP distribution network 216 are shown as "other related servers" 224 in FIG. 2; these might include other functional entities or servers (e.g., web servers, DNS, authentication or RADIUS servers, etc.) necessary to support IP network or other functions. The client devices 110, 221 are in data communication with the IP distribution network and perform the functions of, inter alia, decoding and displaying the video and EAS signals (as well as any audio components), such as on a monitor or other display device.

It will be appreciated that several different embodiments of the above-described IP network may be implemented consistent with the present invention. For example, the video encoders 218 shown in FIG. 2 may be configured to produce multiple bit streams for the same content. Such bit streams could have different bit rates as a function of suitability for transmission over the IP network (e.g., low, medium and high bitrate streams for dial-up, DSL and cable modem IP networks respectively), and/or different encoding formats conforming to audio/video encoding standards such as Real or MPEG or Windows Media Player (WMP), or HD and SD. Similarly, the EAS server subsystem 214 and/or CEAS subsystem 228 could serve the emergency messages or content to the client devices 110, 221 in unicast, multicast or broadcast manner.

Moreover, the functions of the VRS 226, client database 227, and CEAS 228 (or VRS 226, client database 227, and EAS 214), may be integrated into one platform or logical entity within the network, the foregoing architectures being merely illustrative.

Also, it is noted that while localization of emergency messages or video is a highly desired feature, this feature may be omitted or obviated in certain applications, such as when all client devices 110, 221 that a given headend or EAS/CEAS/ VRS system is serving are in the same emergency alert area or FIP code. The placement of the localization function within the network can also be varied; for example: (i) only at the headend 150 or only at the CEAS 228, (ii) partly at the headend or CEAS 228 and partly at the client devices 110, 221, or (iii) exclusively at the client devices 110, 221, and so forth.

The emergency alert data received by the network is typically made available by governmental agencies by broadcasting them at pre-designated frequency over the air (i.e., using electromagnetic or RF transmissions). In some implementations of content distribution networks, these messages may be received in one location within the network, and carried over another medium (e.g., fiber optic transmission, ATM backbone, or millimeter wave system) to other headends or nodes of the network. In such embodiments, the EAS receiver 230 and/or CEAS receiver 240 may not contain an explicit "over-the-air" receiver, but still receive such messages. Alternatively, the EAS/CEAS may be fitted with such an RF receiver to receive the alerts directly and even independently so as to assure redundancy in the event of an equipment failure.

Figure 2B:
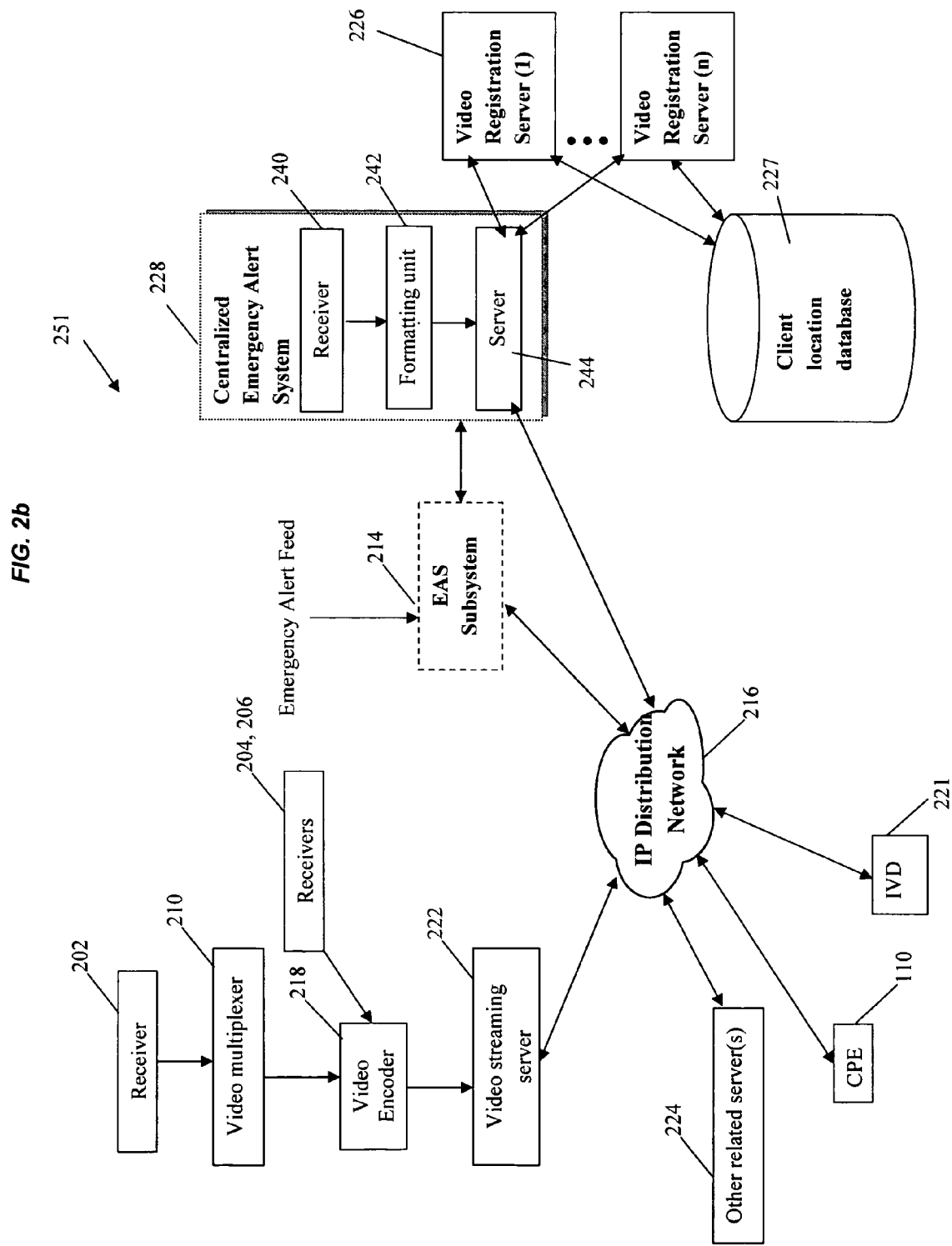
FIG. 2b is a functional block diagram illustrating an exemplary packet-switched distribution network architecture a second embodiment of the centralized EAS (CEAS) of the present invention.

FIG. 2b illustrates another variant of the CEAS-based network 251 of the invention, wherein a CEAS server 244 is used as the primary distribution entity for the EAMs, in conjunction with a plurality of VRSs 226 which function in a generally similar to those of the embodiment of FIG. 2a previously discussed.

Figure 2C:
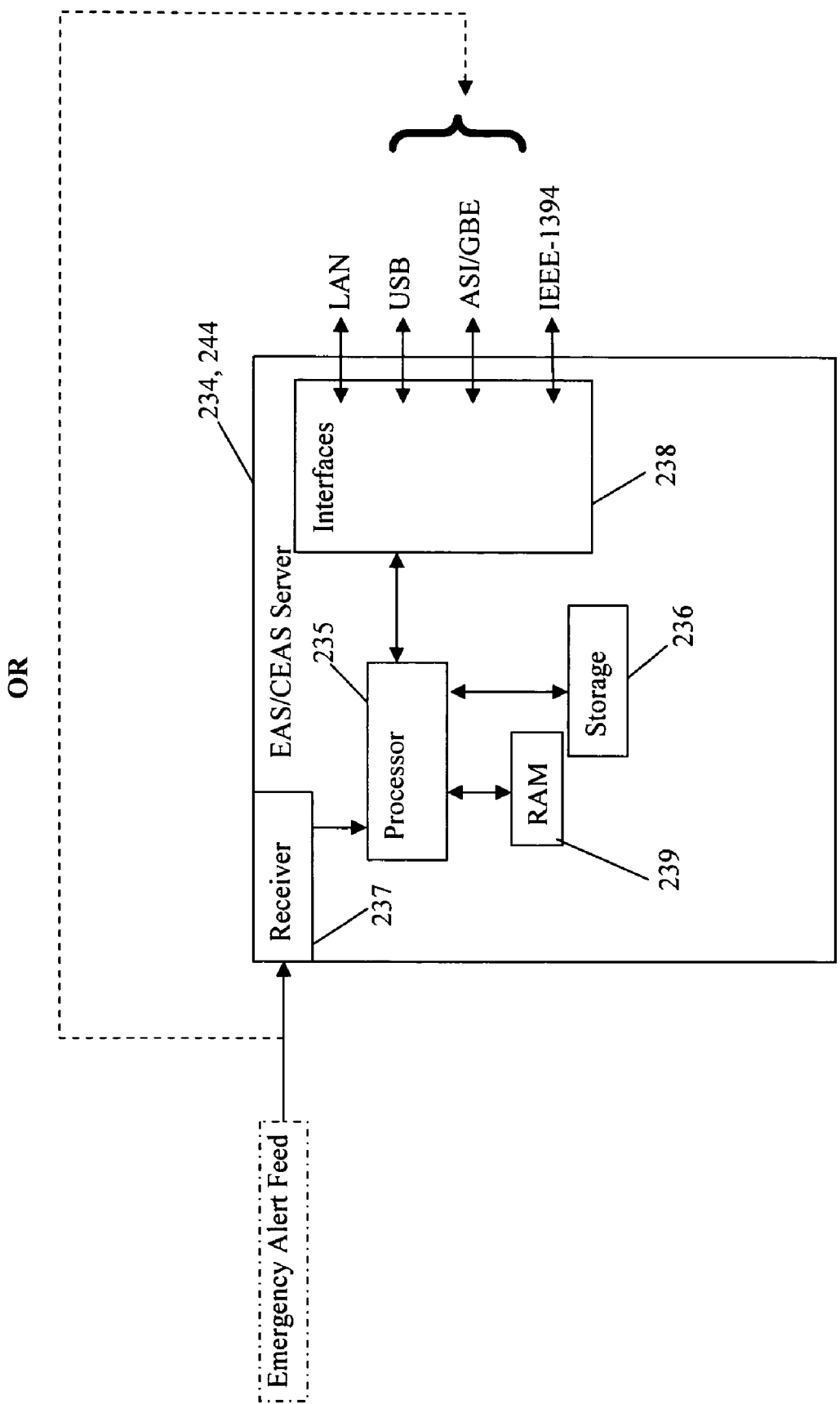
FIG. 2c is a functional block diagram illustrating an exemplary network EAS/CEAS server device according to the present invention.

Referring now to FIG. 2c, an exemplary embodiment of the EAS/CEAS server devices 234, 244 is depicted. As shown in FIG. 2c, the exemplary server 234, 244 generally comprises an IP-based server module including a digital processor(s) 235, RAM 239, mass storage device 236, and a plurality of interfaces 238 for connection with other network apparatus such as LANs, the local service node hardware, IP routers and other packet network devices, network management and provisioning systems, local PCs, etc. Other components which may be utilized within the server 234, 244 (depending on where it is employed and how it is physically implemented) include RF or satellite receivers 237 (for receiving the EAS data feed from the source), encoders/decoders, encryption/ decryption and/or error correction algorithms, board level electronic components, as well as media processors and other specialized SoC or ASIC devices. Support for various processing layers and protocols (e.g., 802.3, SNMP, UDP, H.323, RTP/RTCP, VoIP, SIP, etc.) may also be provided as required. The server 234, 244 may also include a metadata "packager", such as for packaging extracted or inserted EAS data in an XML or other comparable format within a metadata file.

The server 234, 244 of FIG. 2c may take any number of physical forms, comprising for example one of a plurality of discrete modules or cards within a headend, hub or other local node component of the type well known in the art. The server may also comprise firmware, either alone or in combination with other hardware/software components such as those previously described. Alternatively, the server module may be a stand-alone device. The server may also be integrated with other types of components (such as video transceivers, encoders/decoders, etc.) and form factors if desired.

It will be appreciated that the receiver, formatting, and server functions 240, 242, 244 of the CEAS subsystem 228 may comprise a distributed software and/or hardware architecture, such as where the aforementioned functions comprise two or more portions of a distributed application (DA) in communication with one another yet running on different physical devices. Many such permutations and alternate configurations will be recognized by those of ordinary skill given the present disclosure.

Video Registration Server—

As discussed above with respect to both the CEAS 228 and EAS subsystems 214, the present invention advantageously provides the ability to send emergency data to client devices including IVDs 221 which are not directly in communication with the network via an RF connection (e.g., satellite interface or coax drop) or optical fiber interface. An IP video device (IVD) 221 may include, inter alia, cellular telephones or smartphones, laptops, general purpose PC's, gaming consoles, an IP-enabled STB, etc. These devices are not historically associated with a headend entity, thus cannot be controlled by an SNC in the manner discussed above. However, IVDs 221 are provided with a network address (e.g., IP or MAC address) when they are connected to the network. These addresses may be static or transient in nature. The address is used by the IVD 221 to communicate with the network, and request and receive video or other services. The video registration server (VRS) 226 is utilized in the illustrated embodiments provide EAM delivery to the WE) for the EAS or CEAS, depending on architecture.

The VRS 226 of the illustrated embodiment comprises an MSO-controlled network server that is operated (in conjunction with the content systems described above) to enable a non-legacy client device such as an IVD 221 to communicate with the network and receive EAMs, including those which have been amended or appended by the CEAS. The VRS 226 does this by utilizing an IVD's network address, which is stored in the client location database 227, and optionally some form of device-specific identification or authentication (see discussion of FIG. 4 below). As previously noted, the location of the IVD 221 can be determined under a variety of different techniques, including actual geolocation (e.g., use of a GPS or cellular "fix"), or alternatively in a passive fashion by virtue of the IVDs network address or association with a known device (e.g., WiFi AP or gateway).

The VRS 226 may also be adapted to enable a subscriber to manually specify the geographical areas for which the subscriber would like to receive EAMs (i.e., specify a policy); these may include the subscriber's present physical location as well as other locations including those where family/friends, business, or property are located. Under such policy specifications, the EAMs would be delivered to the subscriber's designated network (e.g., EP) address irrespective of the IVD's actual present location. For example, the subscriber may establish that he/she would like to receive EAMs for the geographical area they are presently physically located in, as well as for any other geographical locations he may be interested in (i.e. locations of summer homes or other property, locations of family members, businesses, etc.). Further, the VRS 226 may enable a subscriber to periodically or situationally change the geographical areas for which he would like to receive EAMs, such as when going on vacation, or when moving to another area (e.g., by using a pre-stored template or policy specification for "Vacation Home", "Travel to Client ABC Co.", and the like).

The foregoing user input-based capability can also be used in conjunction with the aforementioned geolocation techniques (i.e., those which do deliver EAMs based on current actual IVD location). Hence, the combination provides the best of both worlds; i.e., the ability to specify delivery of EAMs both (i) at the current location of the IVD regardless of where it is, and (ii) for both static or dynamic locations of interest, including the location where the WVD is actually currently located.

Figure 2D:
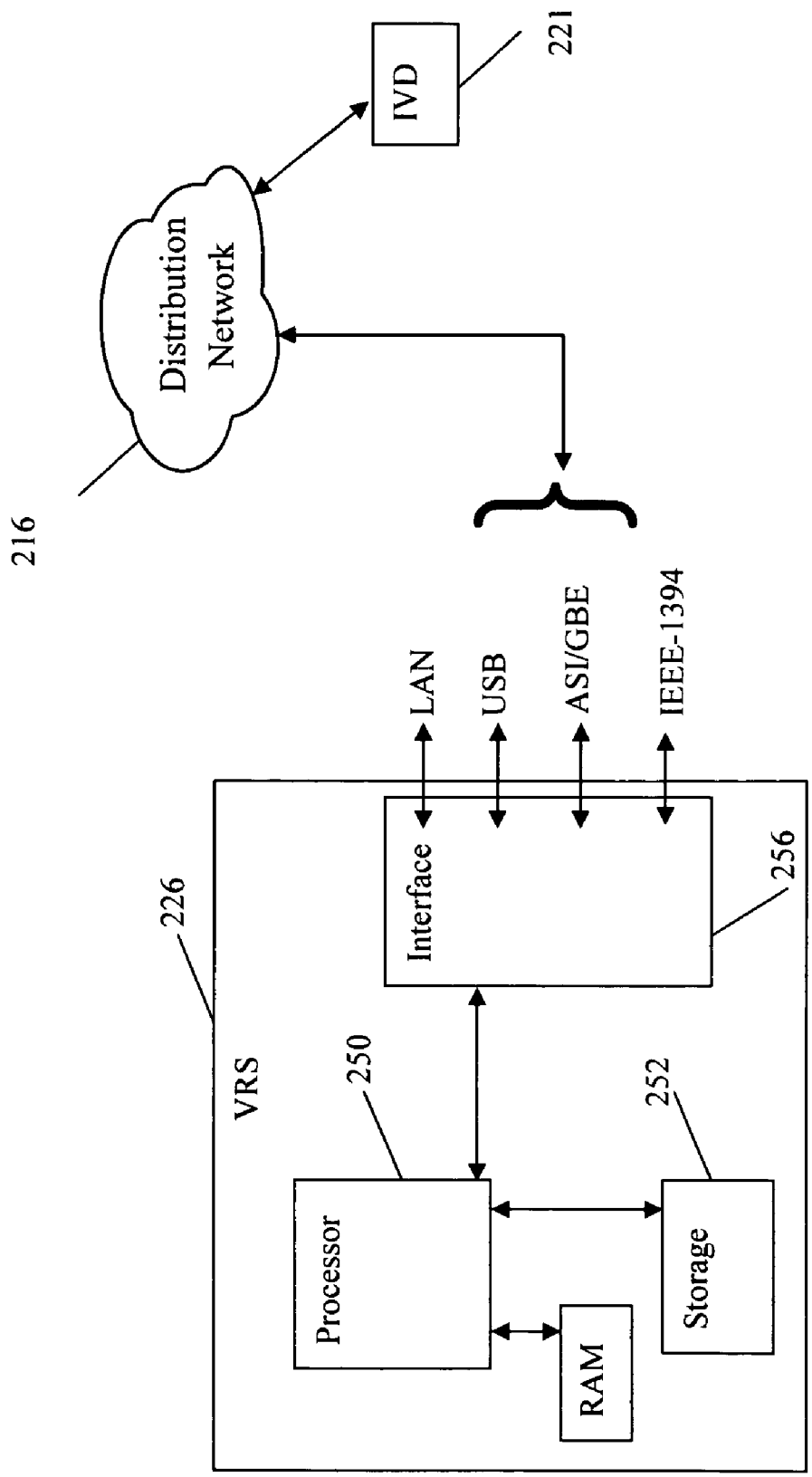
FIG. 2d is a functional block diagram illustrating an exemplary video registration server (VRS) according to the present invention.

Referring now to FIG. 2d, an exemplary configuration of the VRS 226 of FIGS. 2-2b is illustrated. As depicted in FIG. 2d, the VRS 226 comprises a processor 250, and storage element 252. The VRS 226 also comprises a plurality of network interfaces 256 which permit communication between, inter alia, the VRS 226 and client WVDs 221 as well as other network entities (such as the CEAS 228 and the database 227). Communication between the VRS 226 and an IVD 221 (as well as communication between the VRS 226 and other network entities) may occur via a wired or wireless connection of the IVD 221 to an IP distribution network 216 as previously described.

In one variant, a computer program running on the VRS processor 250 is utilized to associate a subscriber's IVD 221 network address to a particular geographic location, and likewise associate that location with one or more FIPs codes for an EAM, in conjunction with the client location database. For example, a subscriber's billing address may be used as the basis for determining associated IVDs, and also to ensure that the subscriber receives EAMs for the FIPs associated with their principal residence or premises. So, for instance, an EAM issued for a FIP code corresponding to zip code 92131 would be distributed to an IP address for a device registered to the subscriber account whose home of record or premises is listed as being within zip code 92131. This delivery may be completely independent of the actual location or relationship of the IVD 221 to zip code 92131; i.e., the IVD may be within that zip code at present, or across the country. The VRS simply delivers any EAM associated with zip code 92131 to that designated IP address.

However, the VRS program may also determine the location of the IVD registered in the client database 227, which may or may not be using its IP address. For example, as previously discussed, the IVD may "register" with the database 227 when it connects to a network at a given location (e.g., associates with a WiFi hotspot in zip code 08034, or receipt of GPS or cellular coordinates within that zip code), thereby allowing the database (using the VRS program) to know the actual geographic location of the IVD. In this case, any EAM for zip code 92131 will be sent to that IVD 221 regardless of its location as in the prior example; however, the VRS program will also send that same IVD any EAMs which are FIP-coded for the actual IVD location (zip code 08034). To the degree that the IVD's network address of record changes, the client database and VRS will maintain the database 227 updated as required.

Also, the VRS will search the client location database 227 for any user-specified locations or zip codes of interest, such as zip code 92590, where the example subscriber's vacation home is located. If found, any EAMs associated with zip code 92590 will also be sent to the then-current network address of the IVD 221, irrespective of its actual location. It is contemplated that a subscriber will in one embodiment be able to make these geographic area selections from the subscriber's IVD 221, such as via a GUI generated by the client application running thereon (see subsequent discussion herein). It is also appreciated that other means of permitting subscribers to select areas may be utilized in conjunction with the aforementioned system including, inter alia, selection by mail, over the Internet via website, over the telephone, via a network proxy, etc.

As discussed earlier, the SNC associated with the EAS subsystem 214 (e.g., DNCS/DAC) establishes the location/correlation of legacy CPE 110 connected to the network, thereby assuring that the same subscriber's home or base premises is also alerted via the legacy CPE 110.

Client Location Database—

As discussed above, the present invention contemplates sending emergency data to a variety of different types of client devices 110, 221 which have previously established an interest in receiving emergency data for various locations through registration with a client location database 227. The devices which may send information to the database 227 include IP video devices (IVDs) 221 (including for example personal media devices or PMDs, laptop or handheld computers, smartphones, etc.), as well as CPE devices 110 (e.g., settop boxes, converged premises devices (discussed below), etc.).

The client location database may be implemented in a number of different forms; e.g., as a separate headend entity in communication with the VSS 222, VRS 226, EAS 214, and CEAS 228, or alternatively situated at a location other than a headend, and may be integrated with any of the logical or physical entities described above. It may also be made part of other extant databases such as the subscriber/billing database maintained by the MSO.

In one scenario, the IVDs 221 is adapted to communicate with the database 227 via the VRS 226 using an IP address associated with the device 221 when the IVD is connected to the network. This connection may be directly to the MSO network (e.g., via a DOCSIS cable modem), or indirectly via the MAN/WAN/internet 105 of FIG. 1 (which may include gateways or portals to 3G IP-based capability for cellular telephones/smartphones, WiFi APs or "hotspots", etc.). Hence, there are multiple routes for the various types of IVDs to connect to the IP portion of the MSO network for communication with the location database 227.

Alternatively, the subscriber's CPE 110 may establish communication with the database 227 via its RF connection (e.g., coaxial drop or satellite uplink) or optical fiber interface to the HFC network.

The client location database 227 of the exemplary embodiment is a database communicating with the VRS 226 which is operated (in conjunction with the content systems described above) to enable client devices 110, 221 to register to receive EAMs. Advantageously, the present invention allows a subscriber with permission to access the database to specify and customize his/her EAM "experience" and delivery parameters, including specifying locations of interest. Such locations of interest may include: (i) the subscriber's premises; e.g., where their CPE is located, which is automatically specified by the MSO in one variant of the invention; (ii) the locations of one or more specified devices (e.g., on a per-device basis, irrespective of where that device is physically located at the time the EAM is issued); (iii) the location of one or more other areas of interest (e.g., where friends or family are located, even though they may not have a CPE or IVD, or be a subscriber); and (iv) "pass-though" locations or waypoints, such as those which the subscriber will be traveling through or to on an upcoming trip.

Accordingly, when, for example, an tornado alert message is issued by the National Weather Service for certain counties or zip codes, the MSO using the EAS/CEAS/VRS infrastructure can rapidly access the client location database 227 to determine which device IDs and/or IP/MAC addresses to route the EAM to. In another embodiment, certain devices 110, 221 (i.e. those in the directly affected area) may merit a first type of message, e.g., an alert or warning; while other devices 110, 221 which are less proximate receive a less urgent message, e.g., a notice or "watch".

In the exemplary embodiment, the subscriber may also specify a "buddy list", wherein the EAMs can be reformatted as an e-mail, SMS message, or other form of communication and distributed to those parties on the buddy list, i.e., to obviate the user then having to call their friends, family, etc. who may not be a subscriber of the MSO network. This feature advantageously allows the subscriber to get the EAM message out to a broader array of persons or entities faster, including those who may not have any other means of receiving an EAM (e.g., a user who only has e-mail or SMS capability). Specifying the buddy list is accomplished in one variant via a user interface (e.g., GUI) associated with the client-side application (e.g., running on a subscriber's CPE 110 or IVD 221) that has the appropriate permissions and access to the database. The user can, e.g., preload the buddy list, and even modify it at the time the EAM is issued in case changes are needed. In another variant, the user can also optionally include a short addendum (akin to a text message) to the EAM, so as to provide additional context or useful information to the targeted recipient, or to let them know why they are receiving this message (e.g., "Tom . . . it's John . . . don't drive to the Mountains; a blizzard is approaching!")

Further, the exemplary client location database 227 may enable a subscriber to periodically or programmatically change the geographical areas for which he would like to receive EAMs, such as when going on vacation, or when moving to another area. Billing address zip codes, city/state names, GPS coordinates, IP addresses (e.g., association with a known location of a WiFi AP or other network node), and any other physical location information for subscribers may also be maintained. A subscriber may be permitted to make changes to an entry in the client location database 227, including inter alia, adding more locations (such as by zip code), removing locations, and/or adding and removing devices.

In terms if item (ii) above, the exemplary embodiment of the invention provides subscribers the ability to identify devices (e.g., IVDs) to the location database, which are then alerted according to user- and/or MSO-specified policies or rules, irrespective of their location. This is accomplished in one variant by using a client-side application running on the IVD which is operative to communicate with the database 227 via the interposed IP network and VRS 226 when that device achieves connectivity (e.g., a "hello, I'm at X location" message) which alerts the database of the IVDs current location, and then periodically thereafter. Alternatively, the database/VRS can cause transmission of a periodic "ping" or similar message to the IP or MAC address or other unique identifier of the IVD causing it to respond with sufficient information to be geographically located. Myriad other approaches for locating mobile IVDs will be recognized by those of ordinary skill. For instance, GPS or cell site information relating to a cellular telephone may be packaged and sent over the cellular carrier's infrastructure to an IP portal, and ultimately to the client database 227.

This approach of using IVD location identification (versus user-specified locations) has the distinct advantage of freeing highly mobile users from having to constantly re-specify their location preferences to the database; rather, the database just keeps track of their current location automatically (assuming they are using their IVD in a networked fashion), and the appropriate EAM delivery policy applied accordingly. In one example, a subscriber traveling across the country in their car may periodically associate with various WiFi hotspots along the way (even while driving), and each association is an opportunity for the IVD to identify its location to the database as previously described. In this manner, the EAS/CEAS/VRS infrastructure would be able to send EAMs relevant to the last known location of the IVD out over the IP network to the IVD.

The foregoing "real time" mobile approach is to be contrasted with (yet is complementary to) the "waypoint" approach previously referenced, the latter which allows a user to plan out a path for a trip or travel in advance of the trip, thereby allowing the user to see existing EAMs for any of the planned waypoints (e.g., blizzard in Colorado). Moreover, under the waypoint approach, a user can set projected times for arrival in various locales so as to coordinate delivery of only the EAMs then pending or incipient. For instance, if a user looks four days in advance at pending/active EAMs for their driving route across the country (i.e., four days before they will be in any of the waypoint locations), then the EAM information will be lagging current "reality" by four days, and the then-pending or active EAMs may not be applicable. Hence, in one variant, the user interface on the CPE or client device application program is adapted to allow the user to also specify the estimated dates/times they will be at each waypoint; this information will be stored in the database 227 and then be used by the EAS/CEAS/VRS system to pass on any geographically and chronologically relevant EAMs to the user. This allows the user to, inter alia, filter those EAMs which are no longer relevant to a given location.

It will be appreciated that many types of information can be used (and in conjunction) as a basis for differentiating message delivery and/or content, such as e.g., subscriber latitude/longitude, GPS coordinates, street address, elevation above sea level, etc. For example, commercially available software packages are capable of mapping given street addresses to an elevation map, earthquake/fault/liquefaction map, etc. Hence, the MSO could feasibly pre-store at a location database 227 or other storage entity such information for each device ID/MAC address, and hence tailor the alert warnings for a heavy rain storm primarily to low-lying areas. Myriad other such "tailoring" approaches are possible according to the present invention.

It is also contemplated that the user may specify a preference for receiving certain types of EAMs, whether for a particular geographic area or areas, or alternatively irrespective of areas. For example, in one variant, a network subscriber specifies that they wish to receive alerts for all hurricanes or cyclones, irrespective of geographic location. In another example, the user specifies that they wish to receive only National Weather Service (NWS) bulletins, notices or alerts for their area or areas of interest. In still another example, the user may specify to receive U.S Geologic Survey (USGS) alerts or data regarding incipient or recent earthquake events in Southern California, irrespective of particular location of each event (but specifying a region generally).

It is further contemplated that the subscriber may be given the ability to 'turn off' any of the abovementioned features at the subscriber's desire.

Server/Client Interaction—

It is appreciated that while the present invention can be implemented in the context of the one-way or "broadcast" model as described above by delivering EAS data irrespective of the program or content the targeted subscribers are each viewing, it can also optionally take advantage of the availability of two-way communication in an IP-based network. For example, see co-owned and co-pending U.S. patent application Ser. No. 11/299,169 filed Dec. 9, 2005 entitled "EMERGENCY ALERT DATA DELIVERY APPARATUS AND METHODS" previously incorporated by reference herein. The aforementioned disclosure discusses the ability of the client devices 110, 221 (e.g., PCs) and EAS/VRS servers (234, 244, 226) to interact in order to further incorporate ancillary or related functions including, inter alia, enforcement of service classes (by verifying whether a user is entitled to receive certain premium or advanced functions), profiling of the client devices 110, 221 (to advise the EAS/CEAS/VRS servers of the client devices 110, 221 capabilities), providing the appropriate EAS data to a client device 110, 221 (i.e., the right bit rate and format), and verifying authenticity (i.e., authentication or identification) of a client device and/or an EAS/CEAS/VRS server.

IP Video Device (IVD) and EAS Client Application—

As discussed above, the present invention is adapted to utilize both legacy CPE as well as non-legacy IP video devices, IVD 221. Legacy devices include STBs or CPEs 110 which may communicate with the network via an RF connection (e.g., satellite wireless link or coaxial cable), or via a fiber interface. An IVD 221 may include, inter alia, IP-enabled STBs, cellular telephones, laptops, general purpose PC's, gaming consoles, etc. These devices are not connected to the network via an RF connection. Rather, they are given a network address and access the network by connection to a network server (e.g., video streaming server 222 and the aforementioned video registration server 226) via an appropriate interface which may include for example a CAT-5 Ethernet cable (e.g., RJ-45), WiFi interface, WiMAX interface, MWBA (802.20) interface, etc.

Figure 2E:
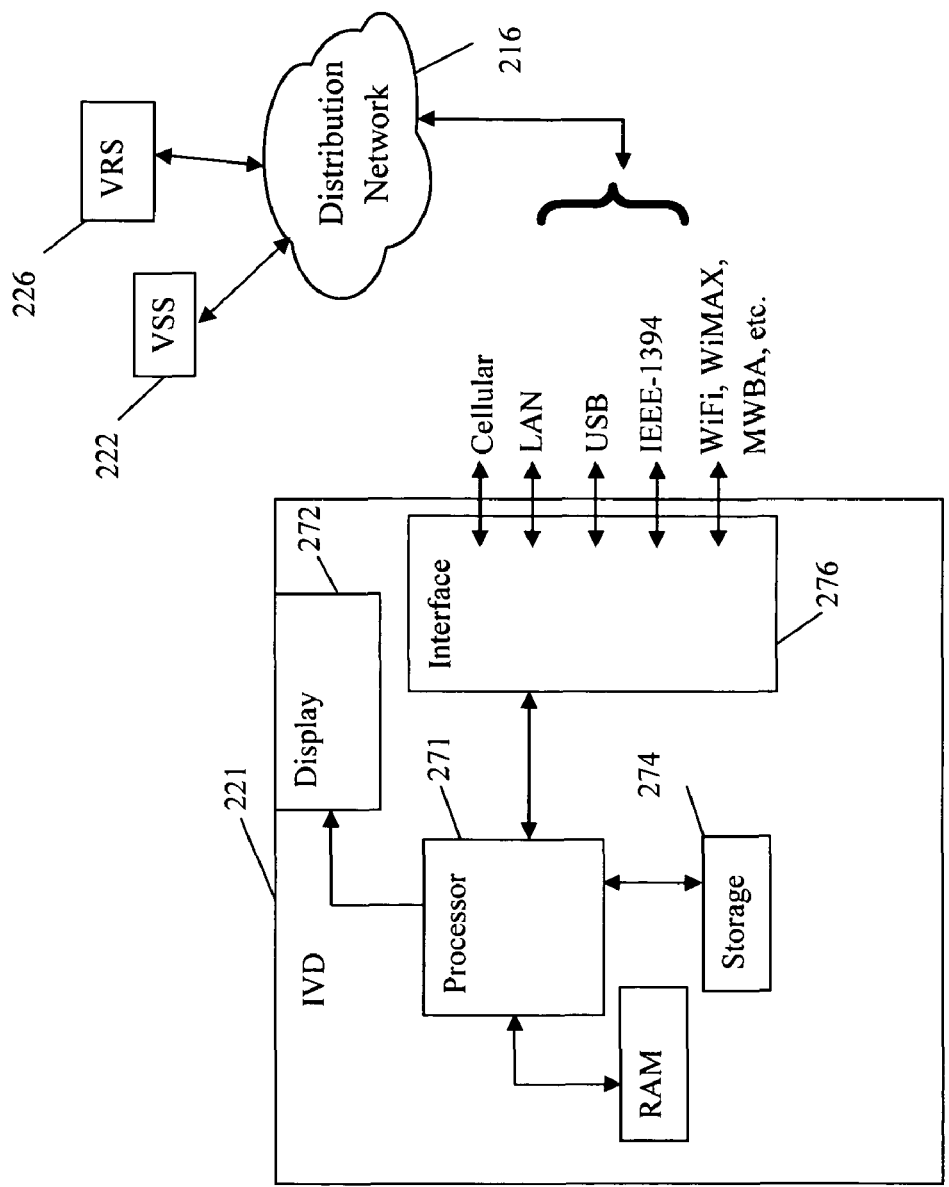
FIG. 2e is a functional block diagram illustrating an exemplary client IP-enabled video device (IVD) adapted for EAS data receipt and display, according to the invention.

Referring now to FIG. 2e, one exemplary embodiment of the IVD 221 of the invention is described in detail. The exemplary IVD 221 includes a computer processor 271, storage 274, input device 270, display device 272, and communications interfaces 276. As noted above, the IVD 221 must be capable of communicating with network entities such as the VRS 226 and VSS 222; this communication may occur for example through the aforementioned RJ-45 LAN connector with Ethernet LAN card, USB port, IEEE-1394 "Firewire" interface, or wireless interface. Computerized systems (whether stationary or mobile) are well known to those of ordinary skill and accordingly not described further herein.

Other components which may be utilized within the device (deleted from FIG. 2e for simplicity) various processing layers (e.g., MPEG, etc.) as well as media processors and other specialized SoC or ASIC devices. Cellular interfaces may also be present. The IVD 221 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The client IVD 221 (which may also be integrated, or in communication with, other client devices, including legacy CPE 110 of FIG. 1) may also include an external or internal modem to achieve connectivity to the network. For example, it is customary to connect the Ethernet port of a PC to an Ethernet output of a cable modem (CM) that itself is connected to a coaxial cable (e.g., DOCSIS) data network. The PC in this case is logically connected to the network side servers via an IP logical (and physical) channel established though a cable modem. In many existing personal computer or media devices connected to IP networks, an audio/video decoder (such as the ubiquitous Windows Media Player, Apple QuickTime™ or Real Video) is readily available on the IVD 221 or easily downloaded thereto. However, such decoders lack support to display EAS message data obtained from an IP stream different than the primary video stream.

As discussed subsequently herein, another application ubiquitously available on such client platforms is an "Instant Messenger" program such as the America Online (AOL) Instant Messenger (AIM) or Yahoo! Messenger or MSN Messenger. The construction and operation of these applications are well known to those of ordinary skill, and accordingly not described further herein.

As discussed above, emergency alert messages in one configuration of the invention are passed to an IVD 221 from a VRS 226 which utilizes EAM data from a CEAS subsystem 228. Thus, in one exemplary embodiment of the present invention, an EAS client application 400 (discussed in further detail below) is implemented to receive/decode/display both EAS video data (e.g., video delivered over a packet stream flow via the VRS/EAS/CEAS, or video streaming server 222 or other IP sources of video) and the EAS audio/text data (delivered by the CEAS subsystem 228 or VRS 226). In another exemplary embodiment, the client-side implementation makes use of existing decoder software (e.g., Real™ decoder) and an IM client program to display EAS video and present audio/text data, generated by the CEAS subsystems 228. In yet another variation, the previous embodiments are further extended by using the IM client software and a corresponding IM server to authenticate a user.

Popular audio/video client software programs such as Windows Media Player™, Apple QuickTime™ or Real™ Video cannot receive and display emergency alert messages. As discussed in greater detail elsewhere herein, the present invention envisions client-side implementations that either complement such widely available video clients by providing a secondary application that runs in conjunction with the video decoders, or a more unitary application program that implements both video decoder and emergency alert audio/text presentation functions (and optionally instant messaging or IM functionality). Accordingly, the terms "client process", "client application" and the like encompass all implementations ranging from discrete software components through a fully integrated solution.

As noted above, in one embodiment of the present invention, a client application 400 is utilized to receive/decode/display EAS data (including video, audio and/or text) or CEAS data (such as an appended or amended EAM) on a client IP video device 221 and/or other, non-IP, legacy CPE

110. The EAS data is generated by either the VRS 226, EAS subsystem 214, or CEAS subsystem 228. The client application 400 of the exemplary embodiment is configured to switch the client device 110, 221 back to its original program stream (if switched away) as applicable, and cease the EAS/CEAS audio data insertion, as well as remove any display text window or overlay. Therefore, as soon as the federal or other requirements for display have been met, the system can advantageously "return to normal" in a seamless fashion without requiring subscriber retuning or other subscriber intervention. In the case of a settop box or other premises CPE 110, the automatic retuning can be locally initiated (e.g., by the client application 400 invoking a re-tune event based on, for example, expiration of a timer variable), or alternatively via remote messaging (e.g., from the VRS, EAS server 234 or CEAS server 244 to the client application 400 indicating that the EAS alert is complete).

In another variant, mobile or portable IVDs, which may be particularly sensitive to power consumption, may be reverted to (or caused to enter if not there previously when the EAM was received) a sleep or dormant state, so as to obviate the user having to affirmatively shut down or place the device in a low power state, and conserve battery power. This functionality may also be predicated on whether the IVD is operating on its battery at that time, or is on an AC charger or other effectively limitless power source.

Myriad other mechanisms for reverting the client devices 110, 221 (and video player) to their original or pre-alert state will be recognized by those of ordinary skill given the present disclosure, and hence are not described further herein. The client applications 400 will be discussed in further detail below.

The methods and apparatus of co-pending and co-owned U.S. patent application Ser. No. 11/198,620 filed Aug. 4, 2005 and entitled "METHOD AND APPARATUS FOR CONTEXT-SPECIFIC CONTENT DELIVERY", which is incorporated herein by reference in its entirety, may also be utilized in conjunction with the client-side software architecture of the present invention. Specifically, the aforementioned application discloses, inter alia, methods and apparatus for utilizing metadata or similar data structures associated with video content as a basis for providing targeted and seamless linking to a secondary content source (e.g., advertising server links) within a video player window displayed on a PC or similar device. Accordingly, the secondary content sources could be constrained in one embodiment to include those of particular relevance to certain emergency situations. For example, in the case of an EAM or video feed relating to a tornado, the data/feed could be embedded or associated with metadata (e.g., XML formatted "tornado") that could be used as the basis of accessing content sources (web sites, local files, third party servers, etc.) that are particularly relevant to and/or useful for tornados, such as the NWS tornado watch site, the local traffic report website, etc. Hence, the user views the relevant EAM content and then is immediately presented with a group of relevant links for further information.

It will also be recognized that due to substantial similarities, the methods and apparatus for caption data (closed captioning) delivery described in co-owned and co-pending U.S. patent application Ser. No. 11/298,247 filed Dec. 9, 2005 and entitled "CAPTION DATA DELIVERY APPARATUS AND METHODS", previously incorporated herein, can be readily used in conjunction with the EAM data delivery apparatus and methods described herein. For example, a common EAS, CEAS, and/or VRS and CC server entity can be specified at the headend 150 or another node to permit the EAS and CC functions to be integrated. Furthermore, the EAS client application can include CC functionality (or vice versa), which may also include the ability to support one or more commercial video decoders (such as Real, H.264, WMP, etc.) as well as IM capability.

It will also be recognized that one or more existing software applications can be used with the present invention to provide the primary functionality of that application in an "EAS-enabled" fashion. For example, in one exemplary embodiment, the Yahoo! Messenger application is used to provide streaming IP media delivery (e.g., chat, audio, video, etc.) that is also enabled for EAS delivery. Myriad other variants of this basic idea will also be recognized by those of ordinary skill provided the present disclosure.

Additionally, it is noted that the client application 400 may in certain embodiments be used as a proxy or substitute for the VRS 226. In one such model, the client application 400 is adapted to receive alert messages (e.g., IP datagrams) and determine, based on user preferences, actual location data, etc. present in the client device 221 itself whether the received alert should be displayed/played. For example, one approach is for the VRS 226 (or CEAS server 244) to broadcast the alert when received to all network subscribers within the VRS registration or client database 227, and in effect let the client devices sort it out for themselves. Based on e.g., client device GPS or cellular fix data, WiFi AP association data, or explicit user inputs, the client application 400 can (i) determine its own location; (ii) determine the location of the user's primary subscription residence (such as via information stored on the client device 221, or via communication with the network subscriber database such as via SMS, e-mail, WAP message, or other such communication); (iii) determine any user-specified locations of interest; and (iv) correlate the FIPS or other location data associated with the alert to any or all of items (i)-(iii). If no correlation exists, the alert is merely discarded. If a correlation does exist, the alert is played as previously described.

It will also be recognized that while many variants of the client application operate on a "real time" alert basis; i.e., they make attempts to alert the subscriber in real time of the alert, such alerts can also be stored for later viewing/playback (especially if they are granted a lower priority or urgency, such as via the "tiered" processing approach described elsewhere herein). Hence, if the user is in an important meeting or the like, and does not want to be immediately disturbed, they can specify that the relevant EAMs be stored in queue or buffer so that when they do log on, or a given period of time expires, the alerts are played.

Localization of Emergency Alert Messages—

Localization refers to "editing" the emergency alert messages or data received by the network operator such that the appropriate subset of client devices 110, 221 to whom the message may be applicable is able to receive and decode it, while other client devices 110, 221 are able to discern that the emergency alert message is not targeted for them. For example, the emergency alert message specification for cable broadcast (ANSI standard J-STD-042-2002, incorporated herein by reference in its entirety) describes localization in the form of county code and subdivision. Localization may also be accomplished by utilization of FIPs codes as previously discussed, and yet other approaches.

In a legacy CPE situation, the locations of modems to which the client devices 110 are attached are available at a network-side server. In other words, for non-IVD's 221, a network entity will have direct knowledge of the location of the device 110 because it is physically connected to the network via an existing RF connection at a known street address, such as by accessing the subscriber database maintained by the MSO. This may comprise, for example, the MAC address or device ID associated with the cable modem that the legacy CPE 110 is connected to.

Alternatively, for WDs 221, network entities may not have direct knowledge of the actual location of the IVD 221 because there is often no direct physical connection of the IVD 221 to the MSO network (unless the WVD is using the DOCSIS modem functionality as its IP connection). Rather, in such cases, geolocation or other such methods as discussed above must be utilized to determine an IVD's 221 location if such location is required. This may be based on the network address the IVD 221 employs to establish a connection with the network, via GPS data provided by the IVD, WiFi AP association data, cellular site or tower data, etc.

Moreover, a subscriber may also manually enter location information; as previously discussed, the present invention enables a subscriber to specify the location(s) for which he/she would like to receive EAMs. These may be locations other than the subscriber's actual physical location.

Hence, in the heterogeneous environment of the present invention (i.e., delivery to potentially multiple different locations and to multiple different types of client devices 110, 221), different localizations of an EAM may be required, and also multiple EAMs may be active or pending for a given subscriber (account) depending on their registered client devices, manually entered geographic locations of interest, the actual locations of their client devices, and so forth. For instance, four or more different EAMs each requiring different localizations may be associated with a given subscriber account, including e.g., (i) a first relating to the location of their home or premises CPE 110 (i.e., their address listed in the subscriber database), delivered over their RF coaxial/satellite or optical interface to their STB such as via a "forced" tuning event; (ii) a second relating to their home or premises address delivered to their IVD (e.g., smartphone or laptop) over an interposed IP network, irrespective of the location of the IVD; (iii) a third relating to the current location of their IVD 221, delivered over the aforementioned IP network; and (iv) a fourth relating to a location of interest (e.g., the subscriber's parent's house in a different state) delivered over the EP network to the IVD, and/or the aforementioned RF or optical interface.

Exemplary Methods—
EAS-Based Data Delivery

Figure 3:
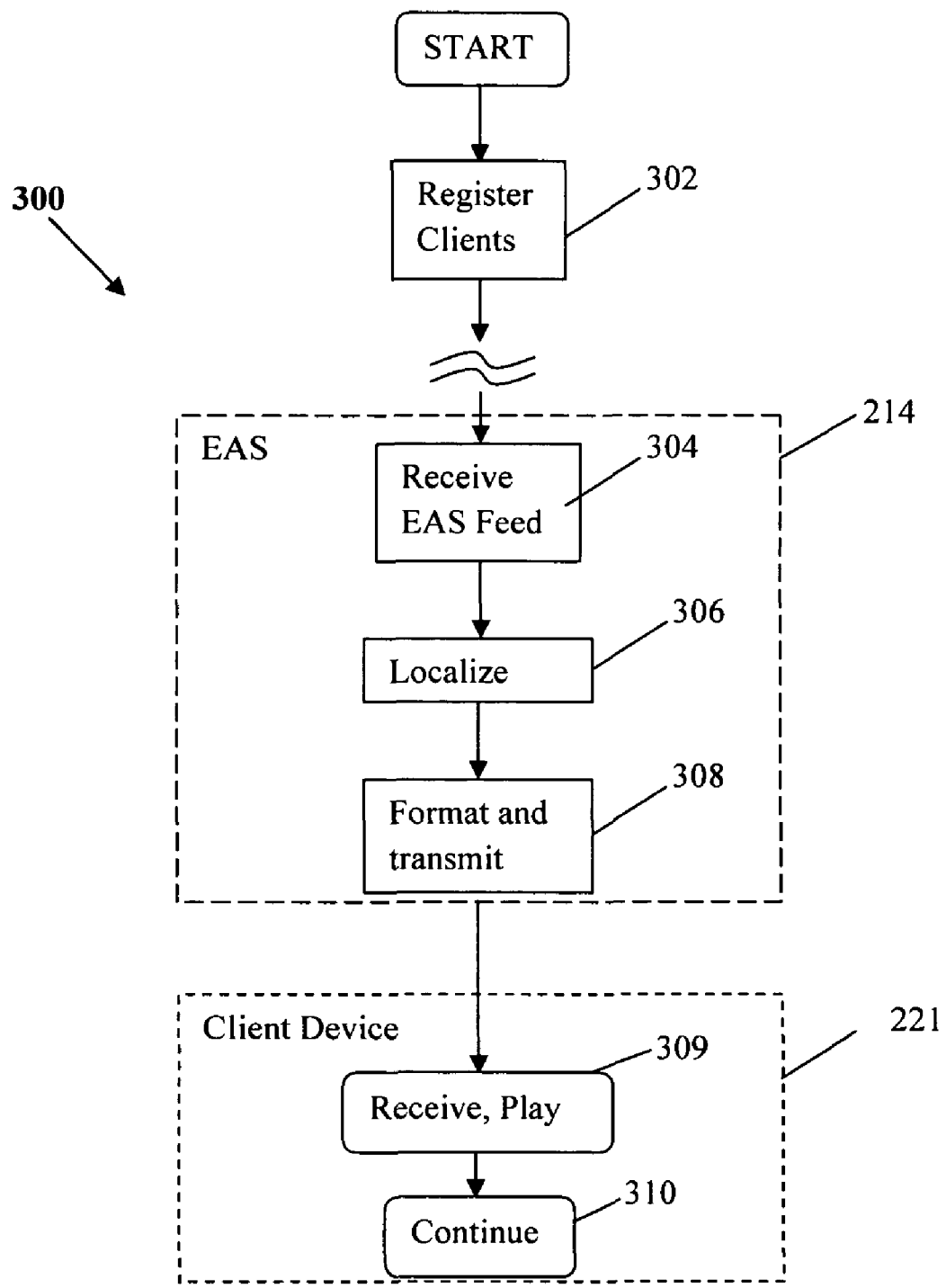
FIG. 3 is a logical flowchart illustrating one embodiment of the method of EAS-based data distribution according to the invention.

FIG. 3 illustrates one exemplary method 300 of EAS data delivery according to the invention.

As shown, the first step 302 of the method 300 comprises registering new network (e.g., IP) clients within a database. This registration can include network identification and address information, as well as geographic location information such as one or more zip code, lat./lon., GPS coordinates, or other such relevant information as previously described, which allows for targeted delivery of EAS data to selected subscriber client devices. The database may comprise the client location database 227 described above, or may be located on the storage element 252 of the video registration server (VRS) 226 or other server or network entity. Further, a subscriber may, in one embodiment, enter various additional geographic areas for which to receive EAS data. According to this embodiment, the subscriber may also specify a time limit for which he is interested in a particular area.

A subscriber may register an IVD 221 by merely establishing a connection to the VRS 226 (which performs the geolocation function based on the IVD 221 network address), or by manually entering the registration into either the VRS 226 or client location database 227. The subscriber may also install the client application 400 and allow it to perform the registration. Thus, the registration step 302 enables the network to uniquely associate the client device to a specific subscriber's account, and optionally to "know" the subscriber's location based on the location of the client device, and send EAM regarding that geographic area (or yet others) as previously described.

Next, the EAS subsystem 214 receives the EAS feed information, such as that relating to a natural disaster (step 304).

Per step 306, the EAS subsystem components perform localization as previously described. For example, in one variant, localization is performed by the VRS 226 comparing the information present in the client location database 227 for the subscriber's premises and/or IVD current location with the targeted FIPs code for the EAM received. It is at this step that the EAS subsystem may optionally implement the tiered approach 330 discussed in greater detail below.

At step 308, the EAM is formatted if required for transmission (as discussed above). The EAM may be transmitted by the EAS or VRS 226 depending on the network configuration, as previously described. Also at step 308, the formatted EAM is transmitted (e.g., broadcast, unicast, or multicast) to the specific subscribers in the area which the EAM pertains. The EAM may be transmitted for example to IVDs 221 for which the EAS/VRS found a FIPs code match in the client location database 227.

At step 310, the client device receives the EAM and displays/plays it accordingly.

Lastly, at step 312, the client devices are returned to "normal" function after the message has been transmitted, such as by termination of the video and audio player processes invoked on the WE) by the client application 400.

CEAS-Based Data Delivery

Figure 3A:
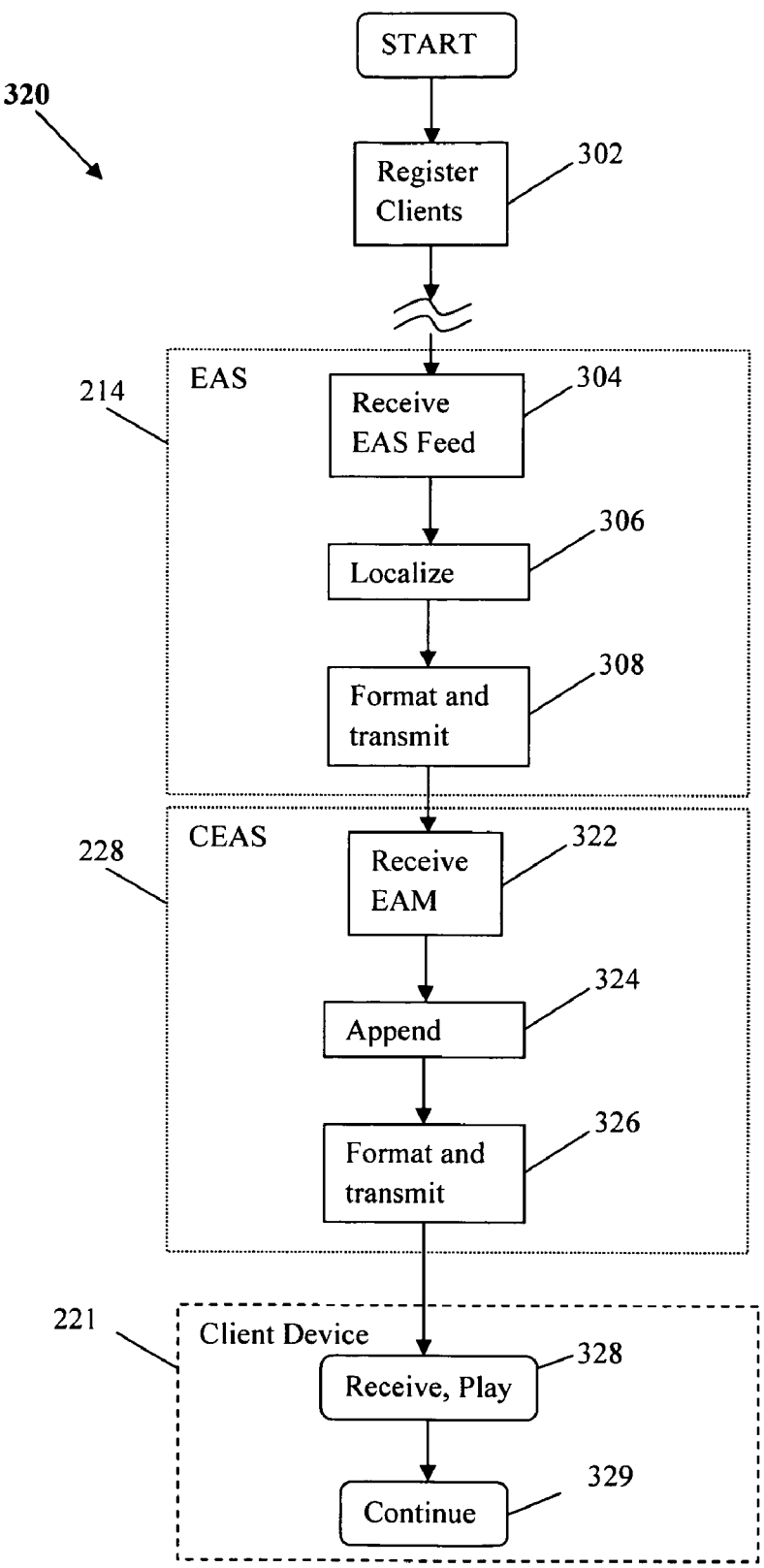
FIG. 3a is a logical flowchart illustrating one embodiment of the method of CEAS-based data distribution according to the invention.

FIG. 3a illustrates another exemplary embodiment of EAS data delivery according to the invention. The method 320 of FIG. 3a, the first few steps 302-308 of which are similar to those described above with regard to FIG. 3, also includes CEAS processing of the EAM, such as to add or amend relevant local-level information to the EAM. At step 308, the EAM is then formatted and transmitted (e.g., broadcast, unicast, or multicast) to the CEAS subsystem 228.

At step 322, the CEAS 228 receives the EAS message sent from the EAS 214. Per step 324, the CEAS subsystem 228 appends or amends the EAM; e.g., by adding area-specific information. The information inserted comprises information such as that generated by a national level entity (e.g., the NWS) which may not be known by the local entities distributing the message. The appended data may comprise, for example, information regarding additional sever weather alerts outside the limited scope of the original EAM, or data on the projected path of the weather after it leaves the local area of the EAM.

At step 326, the appended/amended message is formatted if required and transmitted to all affected subscriber client devices (e.g., those serviced by the CEAS subsystems 228 and selected by the VRS 226 during the localization step 306).

At step 328, the client device receives the EAM from the CEAS server 244 or VRS 226 and displays/plays it accordingly.

Lastly, at step 329, the IVDs 221 are permitted to return to "normal" function after the EAM has been played.

Tiered Message Processing

As discussed above, the present invention establishes a system whereby recipients of an EAM may not be physically present in the geographic area for which the EAM pertains. Thus, it may be advantageous to employ a "tiered" system for the distribution of messages. As used herein, the term "tiered" refers to a hierarchy or classification wherein EAMs slated for delivery to recipient client devices that are located in situ (i.e., within the FIP code-designated area of the EAM) are given different treatment than those designated for devices that are not within the FIP-designated area. Such differing treatment may comprise for example higher priority for QoS (quality of service) or timely delivery over the IP network, added security, encryption, or protection against malicious attacks (such as spoofing, man-in-the-middle, etc.). They might also be given a higher priority or different "break in" (e.g., application termination), device wake-up, or audio/visual alert features on the target IVD 221 and its associated client application 400.

Figure 3B:
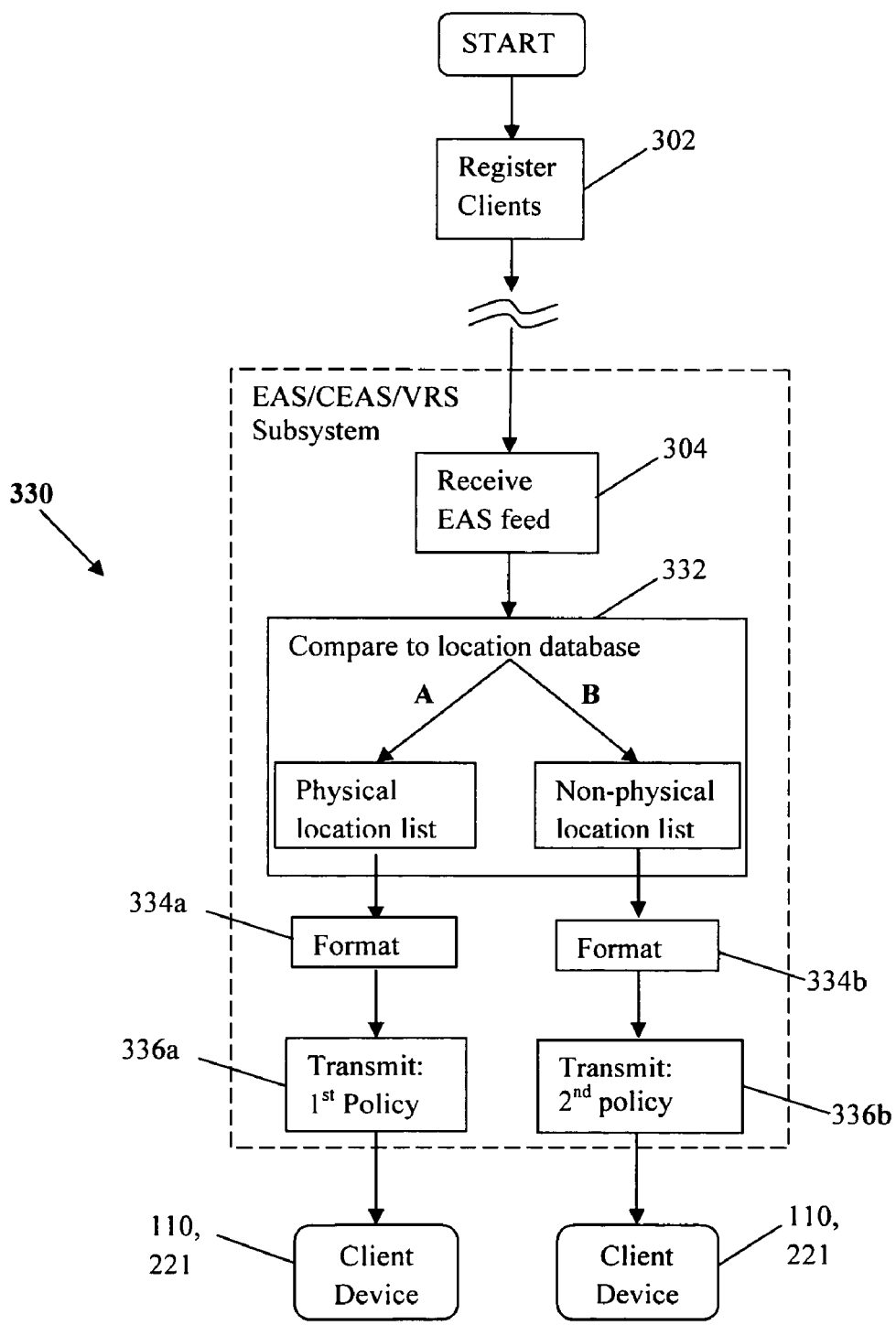
FIG. 3b is a logical flowchart illustrating one embodiment of the method of distributing tiered transmissions according to the invention.

One exemplary method 330 for implementing a tiered system is illustrated in FIG. 3b. At step 302, as above, the subscribers register their client IVDs 221 with the VRS 226 as previously described.

Next, at step 304, the EAS processor 235 or CEAS processor 245 (depending on which subsystem is being used) will receive the EAS data.

At step 332, the EAS or CEAS servers 234, 244 (or VRS 226, if so configured) will compare the FIPs code of the EAM to the client location database 227 or other client information-containing entity. This comparison will be made to (A) a physical location for client devices on the subscriber device list, as well as to (B) any non-physical locations designated by the subscriber. The physical location represents the actual physical location of the client device(s) 221 (i.e., based on information received from geolocation, network association, or manual designation of physical location) at that time. The non-physical locations represents the locations that the designated IVDs 221 are not physically present in but which the subscribers have indicated interest in.

Where the FIPs codes in the physical location list match the FIPs code of the EAM, the servers 234, 244, 226 will "know" that those client devices represent subscribers physically present in the affected area. Thus, the server 234, 244, 226 will format (step 334a) and transmit (step 336a) an EAM to be sent to those client IVDs 221 according to a first policy or priority, which may include for example higher QoS (including reduced latency), use more reliable channels, include device wake-up commands to ensure that the target IVD 221 wakes up from a sleep mode to display/play the alert, etc. The EAS/CEAS/VRS server may also evaluate the list of client devices in light of the current client location database entries for those device to determine which devices present in that location have most recently established their location (such as via a WiFi AP association), and prioritize these devices first.

Moreover, if the device lists indicates that the client device in question is cellular capable (e.g., a 2.5G or 3G smartphone or the like), the client database may also determine if the current telephone number for that device is available, and initiate a call to the cellular phone via a PSTN or other network infrastructure. Ideally, such call will be over a circuit-switched PSTN or the like in that a VoIP-based call likely uses the same IP infrastructure that the transmitted EAM uses, and hence provides no diversity or heterogeneity (redundancy). The intent is to provide the affected subscriber with multiple modes of alert, thereby assuring that they actually receive the EAM while in situ.

Alternatively, where the FIPs codes in the non-physical location list match the FIPs codes of the EAM, the server 234, 244, 226 will "know" that those client devices 221 are interested in receiving the EAM, however are not physically in the affected area. Thus, the server 234, 244, 226 will format (step 334b) and transmit (step 336b) the EAM to be sent to those client devices according to a second policy or priority, which will have e.g., less QoS and latency requirements, may use a less reliable channel, etc.

Authentication of Emergency Alert Messages—

The intended end effect of an emergency alert message on a client device 110, 221 is disruptive to the viewing of audio/video program by the user (i.e., "forced" viewing/hearing of the alert message in whatever form it is delivered). Accordingly, when invoked, the EAS/CEAS/VRS delivery system will preempt (or at very least significantly detract from) all other modalities of content delivery. It is therefore critical to provide a method and apparatus that is robust, such that any unauthorized use of the emergency alert service subsystem 214 and centralized emergency alert service subsystem 228 is: (i) prevented from occurring, and (ii) readily detected and defeated in case the methods of preventing such surreptitious access are somehow bypassed.

Figure 4:
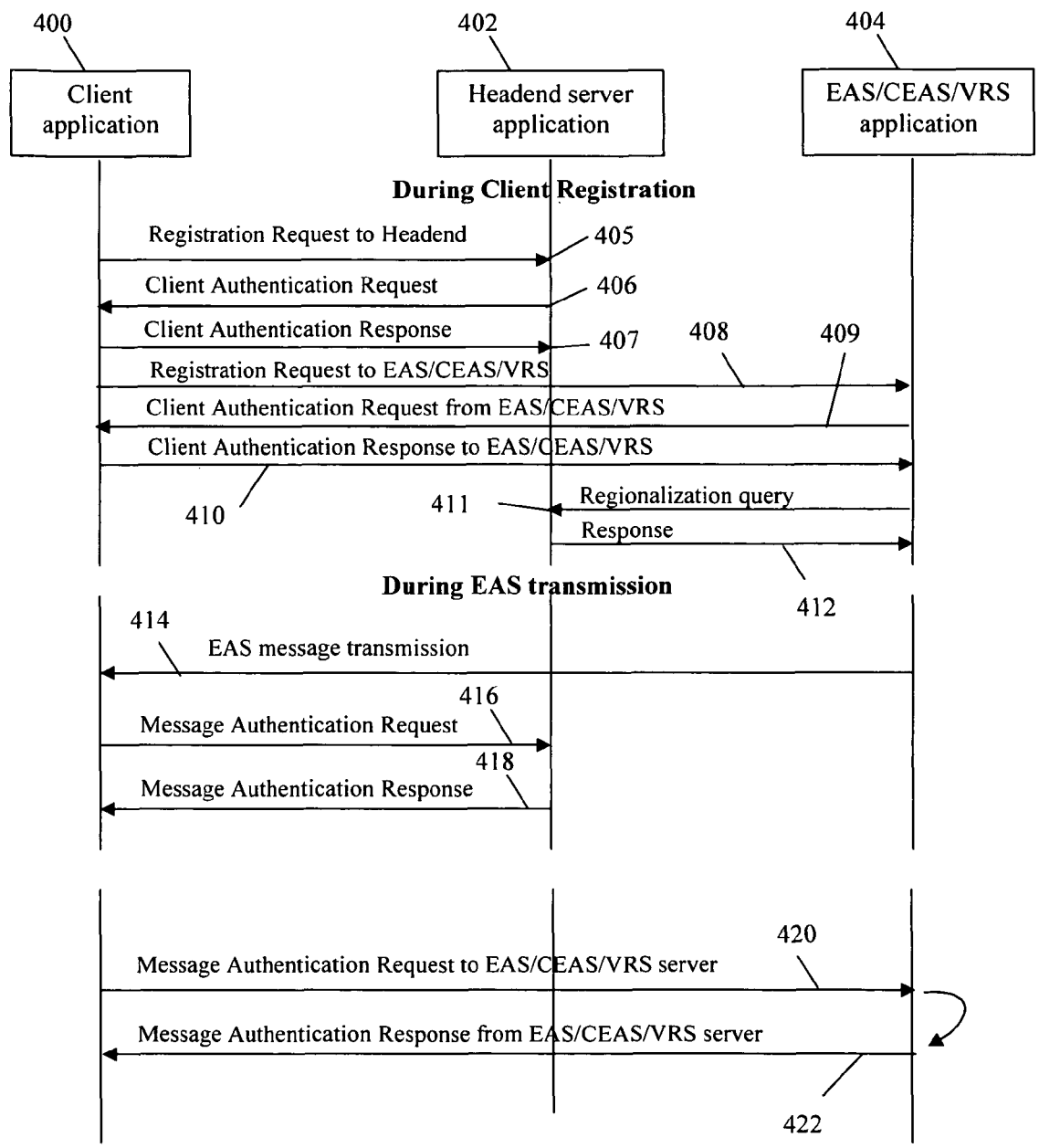
FIG. 4 is graphic representation of an exemplary message exchange protocol showing messages exchanged between various elements of the EAS data processing and delivery system of the present invention.

FIG. 4 is a signal exchange diagram highlighting two exemplary embodiments of the present invention wherein the emergency alert messages received by the client devices are explicitly validated by communication between the client device (as represented by the client application 400) and a headend server process 402, and also between the client application 400 and the EAS/CEAS/VRS server process 404.

FIG. 4 shows a registration request 405 issued from the client application 400 to the headend server process 402. In various embodiments of the invention, the head-end server process may comprise for example a digital certificate authority (CA) server, a network management server associated with a cable modem network, or yet another type of server entity adapted for authentication and/or identification functions, and may further include a headend subscriber database. In response the headend process issues a client authentication request 406 in order to authenticate the client. This may comprise a public/private key pair exchange, challenge, or other method of authentication well known in the data networking arts. In response to the request 406, the client 400 issues a response 407 to enable authentication of the client by the headend. This approach helps prevent surreptitious client devices from registering themselves as being associated with a particular subscriber account.

Next, the client 400 issues a registration request 408 to the EAS/CEAS/VRS process 404 in order to register itself with that entity. The EAS/CEAS/VRS process then issues an authentication request 409 to the client, the latter which responds as previously described with an authentication response 410.

The EAS/CEAS/VRS then may issue a regionalization request 411 to the headend server 402 for the requesting client process 400; the headend process 402 then issues a response 412 that includes relevant localization information for the client process 400 obtained via, e.g., the prior headend/client registration process. The exchange between the EAS/CEAS/VRS and the headend process may also include an authentication exchange of the type previously described if desired (not shown).

When needed, an emergency alert message transmission 414 by the EAS/CEAS/VRS server process 404 to the client device 221 (and its client process 400) occurs. A request/response pair of messages 416, 418 are also shown, wherein upon reception of the EAM 414, the EAS client 400 requests the message's authentication from a head-end server process 402.

In an alternate embodiment of the request/response authentication process, message exchanges 420, 422 can be used as shown in FIG. 4. In this exchange, the client 400 sends a confirmation request back to the EAS/CEAS/VRS server process 404 at the IP address known to the client to verify that the EAM was indeed sent by the EAS/CEAS/VRS server process 404.

Various other embodiments of the message exchange/authentication process are possible according to the invention. These include, but not limited to, use of an encrypted data transmission (e.g., using secure HTTP transmission), VPN/tunneling, security measures according to IEEE-Std. 802.1x, and data hashing techniques based on keys. Some data networks may also include a "firewall" or other comparable software mechanism that filters messages arriving from outside the network on TCP or UDP ports specifically assigned to EAMs. Myriad other approaches and combinations will be recognized by those of ordinary skill when provided the present disclosure.

Instant Messaging Variants—

Figure 5:
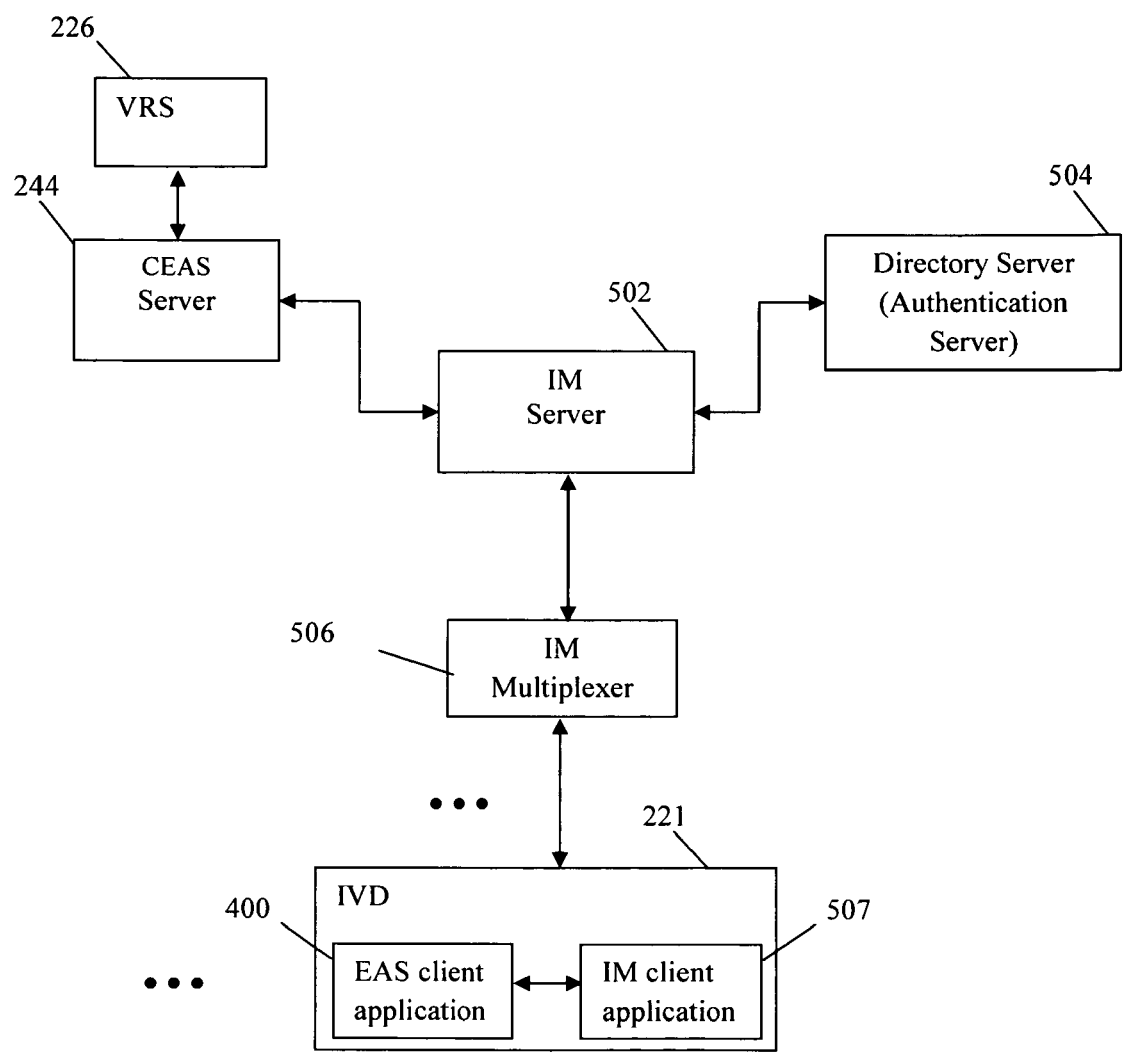
FIG. 5 is a functional block representation of an exemplary network configuration utilizing an instant messaging infrastructure for EAS data distribution.

Referring now to FIG. 5, one exemplary embodiment of the invention using instant messaging (IM) technology and using IM servers 502 available in the IP network to provide EAS messaging connectivity and transport is described. An exemplary configuration in a centralized emergency alert service subsystem 228 and VRS 226 is shown in FIG. 5.

As shown in FIG. 5, the client application 400 (e.g., application running on the IVD 221) is logically coupled to the CEAS server 244 (and VRS 226) via an IM server 502. In turn, the IM server 502 is connected to a directory server 504 (which also optionally functions as an authentication/identification server). The directory server 504 is used to, inter alia, authenticate IM clients 507 such as those disposed on IVDs 221 and provide access to EAS data. The IM multiplexers 506 multiplex and demultiplex EAS data to and from multiple IM clients 507 (not shown) and the IM server 502.

Additional details on exemplary implementations of the EAS functionality using an IM environment shown in FIG. 5 are provided in co-owned and co-pending U.S. patent application Ser. No. 11/299,169 entitled "EMERGENCY ALERT DATA DELIVERY APPARATUS AND METHODS", previously incorporated herein.

Client Protocol Stack and Emergency Video Feed Considerations—

Various aspects of the client device 110, 221 operation and protocol stack must be considered in the context of EAS data/video delivery via the EAS subsystem 214/CEAS subsystem 228 and VRS 226.

In the case of an emergency alert video feed, several functional elements of the EAS subsystem 214, CEAS subsystem 228 and VRS 226 must work in coordination with each other. Specifically, the emergency alert video servers 234, 244, 226 must have sufficient availability and capability such that video in multiple formats (QuickTime, Windows Media, H.264, etc.) can be streamed appropriately to client devices 110, 221.

Additionally, the IVD 221 application software stack must be arranged such that the client application 400 is able to force display of the EAS video or window by the video decoder application, as well as muting the ongoing audio portion of the pre-existing content-based program, and output EAS audio in its place. In this sense, the client application 400 acts somewhat like an OCAP "monitor" application for a DSTB; the client application 400 must have significant control over the necessary hardware/firmware/software processes in the IVD 221 order to effectuate these functions, such as being able to immediately terminate audio decoding (or at least the feed of decoded audio data to the audio delivery hardware) in favor of the EAS audio data.

The EAS message(s) must also be authenticated so that "spoof" EAS attempts are avoided or eliminated. For example, this can be accomplished by inter alia, authenticating the message itself (hashing, digital certificates), authenticating the source of the message, and/or by authenticating the IP address/port ID to which the EAS message is requesting a re-tuning (for example, forced re-tuning can only occur when the target comprises a fixed or predetermined IP/port combination as pre-programmed in the EAS client).

Business Methods—

In another aspect of the invention, methods of doing business associated with the EAS and/or CEAS data delivery capability previously disclosed herein are now described in detail.

In one variant, these methods effectively bundle or link one or more features not critical to (but ideally useful or desirable with) the EAS data delivery in order to provide subscribers enhanced functionality and "user experience." While the provision of basic EAS data (e.g., audio, text, and/or video) to subscribers is essentially mandated by federal regulation, ancillary services or capabilities are not, and subscribers may find these ancillary services and capabilities useful. These ancillary services or features can comprise a basis for a multi-tiered or "premium" subscriber class business model, be given as an incentive feature for a subscription, or otherwise.

One exemplary ancillary service that can be bundled with the EAS data delivery comprises the ability to receive EAMs on remote entities in data communication with the base (e.g., IP) distribution network. For example, the service of providing EAMs relevant to the subscriber's home premises to their designated IP devices (e.g., laptops or iPhones™) while they are away could be part of an incentive or value-added model, since such capability is not mandated by federal regulation.

Similarly, providing geolocation-based functions, such as delivering EAMs selected based on the actual location of the mobile device or IVD 221, could comprise another basis for the business model, as could the ability for the user to enter their own designated areas of interest (e.g., for friends and family). Likewise, broader distribution of EAMs (such as to the aforementioned friends and family via e-mail), including the ability to personalize or add information to the EAM such as text or pictures, might comprise a "premium" service feature within the MSO's offerings.

It will also be appreciated that the ability to deliver EAMs in some format to a broad array of IVD or other client device types has particular utility in the context of time-sensitive emergencies; e.g., tornadoes and fast-moving fires among others. Specifically, in the case of a tornado, many occur at night, when both visibility is poor and many people may be asleep and not monitoring their televisions or even personal computers. Under prior art approaches, no other timely way of directly warning individuals in such circumstances was available, short of an audible siren or Reverse-911 system. Each of these prior art systems has disabilities in this context, however; i.e., the individual may not be near a siren or may not be able to hear it for whatever reason, and Reverse-911 systems have appreciable latency associated therewith. In contrast, the exemplary system of the present invention allows such individuals to be alerted via a personal media or communications device (e.g., smartphone) if so registered with the VRS 226, which can ring, blink, vibrate, etc. Hence, a user can be warned in a very timely fashion via their personal communications device, even when they are asleep, since the IP-based approach of the present invention does not suffer the latency issues of PSTN-based solutions such as Reverse-911. This desirability may also serve as the basis for a business model; i.e., marketing the service as for example an "Enhanced" or "High speed" EAS service which provides up-to-the-minute delivery of EAMs to MSO subscribers any-where in the world, and for which the MSO could charge extra (or offer as an incentive as part of a premium service package or the like).

It would also be advantageous for and desirable to subscribers who have plans to travel or who are interested in properties or persons in various geographic areas to be able to manually select those areas and view any EAM issued regarding these locations. A subscriber may, for example, set up the client devices 110, 221 to always receive EAS data for the home, or parents or other family members' homes. A subscriber may also set up the client devices 110, 221 to receive EAS data for a specified period of time for a location where he is traveling.

The above services enable a subscriber to know, for example, that their residence is subject to a hurricane, fire or tornado warning so that they can take pre-emptive action or monitor the situation more closely. This also would relieve the subscriber of the requirement of monitoring conventional information channels such as TV news or radio in their current (remote) area in order to glean information regarding the location of their residence, etc. Hence, the system could become a "remote first warning" mechanism for the subscriber, irrespective of their location. Only connectivity to the bearer (e.g., IP) network would be required in order to utilize this feature.

Another such ancillary service could comprise providing topically related or coupled information sources, such as e.g., direct or real-time Doppler radar feeds from NWS or similar entities in the local region in the case of an EAS tornado alert message, or NWS satellite or radar imaging for an impending hurricane. These ancillary sources could be directly coupled to the EAS data delivery, such as where the video stream/feed to which the client application 400 tunes includes this information along with or in place of the less-descriptive federally mandated information. For example, in one variant, a multi-pane display comprising, e.g., (i) the federally mandated alert message or data, (ii) local evacuation route/traffic information, (iii) Doppler/satellite imaging, and (iv) real-time "incident" reporting (somewhat akin to real-time traffic incident reporting "blogs" currently maintained by California DOT/ Highway Patrol) could be provided to subscribers in order to provide them multi-source data fusion when it is most needed (i.e., at the time of report). This also obviates the subscriber having to hunt for this information, such as by Internet searches, thereby wasting potentially precious time.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A client device adapted for use within an Internet protocol (IP) network, comprising:
   a receiver, said receiver adapted to receive content from said network;
   a decoder, said decoder adapted to decode said content;
   a content rendering apparatus, said rendering apparatus adapted to render said content; and
   a processor, said processor adapted to run at least one computer program, said at least one program configured to:
      register with a network entity, said registration including information identifying at least one location other than a location which said client device is located;
      receive and decode emergency alert data relating to said identified location based at least in part on said registration;
      substantially preempt at least an audio portion of said content being decoded and rendered on said client device; and
      render said decoded emergency alert data.

2. The client device of claim 1, wherein said at least one program is further adapted to return said client device to said content after completion of said emergency alert data.

3. The client device of claim 1, wherein said emergency alert data comprises textual data, and said at least one program configured to receive emergency alert data comprises an instant messaging program.

4. The client device of claim 1, wherein said receiver comprises a radio frequency (RF) interface adapted to associate with a wireless gateway or access point.

5. The client device of claim 4, wherein said RF interface is compliant with an IEEE Std. 802.11 WiFi Standard.

6. The client device of claim 1, wherein said device further comprises a cellular wireless interface.

7. The client device of claim 1, wherein said registration with said network entity comprises registration with a network entity within a cable television or satellite content delivery network, said network entity having access to a subscriber database of said cable or satellite network.

8. The client device of claim 7, wherein said at least one computer program comprises a client portion of a client-server architecture, and said registration by said at least one program comprises association of said client device with at least one subscriber account for said cable or satellite network.

9. The client device of claim 1, further comprising apparatus adapted to provide information as to the current physical or geographic location of said client device to said network entity over said IP network.

10. The client device of claim 9, wherein said another entity comprises a registration entity within a cable television or satellite network, and said alert data comprises data relevant to said physical or geographic location.

11. The client device of claim 1, wherein said at least one computer program further comprises a user interface, said user interface adapted to receive said information identifying said at least one location other than said location which said client device is located from a user of said client device.

12. The client device of claim 1, wherein said content being rendered comprises audio-only content, and said emergency alert data comprises audio-only data.

13. For use in a content distribution network, emergency data registration apparatus capable of determining a location of a plurality of client devices and storing information relating thereto, said registration apparatus comprising:

a storage device, said storage device adapted to store said plurality of data relating to said individual ones of said plurality of client devices; and a processor in data communication with said storage device and adapted to run at least one computer program thereon, said at least one computer program adapted to:

compile a plurality of data relating to respective physical locations of individual ones of said plurality of client devices;

correlate one or more of said individual ones of said client devices to a single user account;

correlate said single user to at least one additional location; and designate said one or more correlated client devices for delivery of emergency alert data relating to said respective physical locations of said client devices and said at least one additional location.

14. The apparatus of claim 13, wherein:

at least one of said plurality of client devices comprises consumer premises equipment in signal communication with a radio frequency interface at a premises indicated within said single user account; and at least one of said plurality of client devices comprise a substantially portable Internet protocol (IP)-enabled device not disposed at said premises.

15. The apparatus of claim 13, wherein said compiling occurs upon receipt of requests for access to said network by respective individual ones of said plurality of client devices.

16. The apparatus of claim 13, wherein said data relating to said respective physical location of individual ones of said devices comprises at least one of: (i) IP addresses of respective ones of said plurality of client devices; and (ii) association with a particular gateway or access point having a known or determinable location.

17. The apparatus of claim 13, wherein said act of compiling comprises utilizing data from a subscriber database to determine said respective physical locations of at least one of said client devices.

18. The apparatus of claim 13, further comprising apparatus configured to receive information useful in correlating said single user to said at least one additional location, said at least one additional location comprising one or more geographic areas of interest.

19. The apparatus of claim 13, further comprising apparatus adapted to transmit said emergency alert data based at least in part on said designation.

20. The apparatus of claim 19, wherein said apparatus adapted to transmit said emergency alert data is further adapted to:

discover one or more audio or video processing capabilities of said one or more correlated client devices; and process said emergency alert data in at least one aspect so as to be compatible with said discovered one or more capabilities.

21. The apparatus of claim 20, wherein said discovery comprises accessing a database of information maintained by an operator of said content based network relating to at least said one or more correlated client devices, and said processing comprises at least one of transcoding or transrating said emergency alert data.

22. The apparatus of claim 13, wherein said at least one computer program is further adapted to assign at least one of a plurality of quality of service (QoS) levels to said delivery of said emergency alert data.

23. The apparatus of claim 22, wherein said assignment of at least one of a plurality of quality of service (QoS) levels to said delivery of said emergency alert data is based at least in part on a correlation between said respective physical locations of said correlated devices and one or more locations associated with said emergency alert data.

24. A method for distributing emergency alert data to a user of a content distribution network, comprising:

receiving emergency alert data relating to at least a location of interest to said user;

distributing said emergency alert data to a first client device associated with said user over said content distribution network, said first client device being physically located at a first location;

distributing said emergency alert data to a second client device associated with said user over a network other than said content distribution network, said second client device being physically located at a second location different than said first location; and applying different quality-of-service (QoS) policies to said acts of distributing, respectively, based at least in part on said first and second locations.

25. The method of claim 24, wherein said content distribution network comprises a cable television or satellite network, and said other network comprises a packet-switched Internet Protocol (IP) network.

26. The method of claim 24, wherein said location of interest comprises the same location as at least one of said first or second client devices.

27. The method of claim 24, wherein said location of interest comprises a location previously specified by said user as a location of interest, yet which is different than said first and second locations.

28. The method of claim 24, comprising applying different client device video or audio play policies to said acts of distributing, respectively.

29. The method of claim 24, wherein:

said distributing said emergency alert data to a first client device associated with said user over said content distribution network comprises distributing said emergency alert data to a first client device having a substantially fixed location and associated with said user; and said distributing said emergency alert data to a second client device associated with said user over a network other than said content distribution network comprises distributing said emergency alert data to a portable or mobile client device at said second location.

30. The method of claim 29, wherein said distributing to said first client device comprises distributing over a cable television or satellite network, and distributing to said second client device comprises distributing over a packet-switched Internet Protocol (IP) network.

31. The method of claim 29, wherein said distributing to said first client device comprises distributing over a cable television or satellite network, and distributing to said mobile or portable client device comprises distributing over a cellular data or telephony network, said mobile or portable device comprising a device having a radio frequency interface adapted to communicate with said cellular network.

32. The method of claim 29, wherein said distributing to said mobile or portable client device comprises distributing over a packet-switched Internet Protocol (IP) network, said distributing comprising sending said alert data to said client device using an IP address previously registered by said user.

33. The method of claim 29, wherein said distributing to said mobile or portable client device comprises distributing over a packet-switched Internet Protocol (IP) network, said distributing comprising sending said alert data to said mobile or portable client device using a network address dynamically assigned thereto, said network address correlated to said mobile or portable device using at least a unique device identification (ID).

34. The method of claim 24, wherein said location of interest comprises said first location, and said act of applying different QoS policies comprises applying a first quality-of-service (QoS) policy to said distribution of said emergency alert data to devices physically located at said first location, and applying a second, lower QoS policy to said distribution of said emergency alert data to devices not physically located at said first location.

* * * * *